US012612764B2

(12) United States Patent
Shimizu et al.

(10) Patent No.: US 12,612,764 B2
(45) Date of Patent: Apr. 28, 2026

(54) UNMANNED WORK MACHINE

(71) Applicant: HITACHI CONSTRUCTION MACHINERY CO., LTD., Tokyo (JP)

(72) Inventors: Juri Shimizu, Tokyo (JP); Teppei Saitoh, Tokyo (JP); Shinya Imura, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 267 days.

(21) Appl. No.: 18/018,050

(22) PCT Filed: Jul. 21, 2021

(86) PCT No.: PCT/JP2021/027372

§ 371 (c)(1),
(2) Date: Jan. 26, 2023

(87) PCT Pub. No.: WO2022/024931

PCT Pub. Date: Feb. 3, 2022

(65) Prior Publication Data

US 2023/0257963 A1 Aug. 17, 2023

(30) Foreign Application Priority Data

Jul. 31, 2020 (JP) ................................. 2020-130331
Jul. 31, 2020 (JP) ................................. 2020-130384

(51) Int. Cl.

*E02F 9/20* (2006.01)
*E02F 9/26* (2006.01)
*G08B 3/10* (2006.01)

(52) U.S. Cl.

CPC .......... *E02F 9/2054* (2013.01); *E02F 9/2045* (2013.01); *E02F 9/205* (2013.01); *E02F 9/26* (2013.01); *G08B 3/10* (2013.01)

(58) Field of Classification Search

CPC ....... E02F 9/2054; E02F 9/2045; E02F 9/205; E02F 9/26; E02F 3/435; E02F 9/262;
(Continued)

(56) References Cited

U.S. PATENT DOCUMENTS 655,980 A * 8/1900 Levy et al. .............. A47K 3/02 4/584
6,363,632 B1 * 4/2002 Stentz ....................... E02F 9/24 701/50

(Continued)

FOREIGN PATENT DOCUMENTS

EP 0655980 A1 * 6/1995 ............... B60Q 1/00
JP 2000136549 A 5/2000

(Continued)

OTHER PUBLICATIONS

M. Hutter et al., "IBEX—A tele-operation and training device for walking excavators," 2016 IEEE International Symposium on Safety, Security, and Rescue Robotics (SSRR), Lausanne, Switzerland, 2016, pp. 48-53, doi: 10.1109/SSRR.2016.7784276. (Year: 2016).*

(Continued)

*Primary Examiner* — Russell Frejd
*Assistant Examiner* — Ana D Thomas
(74) *Attorney, Agent, or Firm* — MATTINGLY & MALUR, PC

(57) ABSTRACT

Provided is an unmanned work machine capable of reliably coordinating with a manned work machine and smoothly executing work. An excavating machine 100 is an unmanned work machine capable of working in coordination with a hauling machine 200 that is a manned work machine. The excavating machine 100 includes sound collectors 31*a* and 31*b* that are a receiver receiving a notification regarding the operating status of the hauling machine 200 or an operating instruction to the excavating machine 100, which are trans-
(Continued)

mitted from the hauling machine 200 in response to the operation by an operator aboard the hauling machine 200, and a controller 10 that controls the operation of the excavating machine 100 in accordance with the received notification.

4 Claims, 15 Drawing Sheets

(58) Field of Classification Search
CPC .. E02F 9/265; E02F 9/268; E02F 9/24; G08B 3/10; G08B 21/18; H04N 7/183; H04N 7/18; G05D 1/0282; G06Q 50/00
See application file for complete search history.

(56) References Cited

U.S. PATENT DOCUMENTS

| | | | | |
|---|---|---|---|---|
| 7,277,784 | B2 | 10/2007 | Weiss | |
| 9,037,338 | B2 | 5/2015 | Osagawa et al. | |
| 9,593,463 | B1 | 3/2017 | Hiranaka | |
| 2013/0211712 | A1 | 8/2013 | Takeda | |
| 2013/0298032 | A1 | 11/2013 | Sugaya | |
| 2014/0107895 | A1* | 4/2014 | Faivre | E02F 9/2029 701/50 |
| 2014/0231153 | A1* | 8/2014 | Fukasu | E02F 9/2029 177/25.13 |
| 2015/0178859 | A1* | 6/2015 | Takeda | G06Q 10/08 705/7.24 |
| 2019/0317521 | A1* | 10/2019 | Nishi | G05D 1/0276 |
| 2020/0283993 | A1 | 9/2020 | Minagawa et al. | |
| 2021/0165414 | A1 | 6/2021 | Aizawa et al. | |
| 2021/0363726 | A1 | 11/2021 | Aizawa et al. | |
| 2023/0123961 | A1* | 4/2023 | Morizane | G08G 1/207 701/2 |
| 2023/0167627 | A1* | 6/2023 | Ohyama | E02F 9/264 701/2 |

FOREIGN PATENT DOCUMENTS

| | | | | |
|---|---|---|---|---|
| JP | 2007-188224 | A * | 7/2007 | E02D 9/20 |
| JP | 2012022611 | A | 2/2012 | |
| JP | 2019065660 | A | 4/2019 | |
| JP | 2020-60032 | A | 4/2020 | |
| JP | 2020060032 | A2 | 4/2020 | |
| KR | 10-2012-0033519 | A | 4/2012 | |
| KR | 10-2013-0123287 | A | 11/2013 | |
| KR | 10-2016-0142079 | A | 12/2016 | |
| WO | 2013065415 | A1 | 5/2013 | |
| WO | 2015025369 | A1 | 2/2015 | |
| WO | 2015/087382 | A1 | 6/2015 | |
| WO | 2020026506 | A1 | 2/2020 | |

OTHER PUBLICATIONS

H. Saito, H. Sugiura and S. Yuta, "Development of autonomous dump trucks system (HIVACS) in heavy construction sites," Proceedings of 1995 IEEE International Conference on Robotics and Automation, Nagoya, Japan, 1995, pp. 2524-2529 vol. 3, doi: 10.1109/ROBOT.1995.525638 (Year: 1995).*
Stentz, Anthony, et al. "A robotic excavator for autonomous truck loading." Autonomous Robots 7.2 (1999): 175-186. (Year: 1999).*
Sherafat, Behnam, Abbas Rashidi, and Siyuan Song. "A software-based approach for acoustical modeling of construction job sites with multiple operational machines." Construction Research Congress 2020. Reston, VA: American Society of Civil Engineers, 2020. (Year: 2020).*
Chinese Office Action received in corresponding Chinese Application No. 202180058865.1 dated Jul. 19, 2024.
International Search Report of PCT/JP2021/027372 dated Aug. 31, 2021.
Extended European Search Report received in corresponding European Application No. 21851386.9 dated Aug. 6, 2024.
Korean Office Action received in corresponding Korean Application No. 10-2023-7002979 dated Oct. 31, 2024.

* cited by examiner

UNMANNED WORK MACHINE

TECHNICAL FIELD

The present invention relates to unmanned work machines.

BACKGROUND ART

Recently unmanned work machines, including hydraulic excavators, have been developed, which are operable without an operator aboard (e.g., Patent Literature 1).

Patent Literature 1 describes a system for unmanned excavation, in particular a system for performing excavation and loading work using an unmanned excavating machine.

CITATION LIST

Patent Literature

Patent Literature 1: JP 2000-136549 A

SUMMARY OF INVENTION

Technical Problem

At actual sites for excavation and loading work, an excavating machine such as a hydraulic excavator and a hauling machine such as a dump truck work together to perform the excavation and loading work. In particular, when a hauling machine enters toward a predetermined position to load it with the excavated materials, or when the hauling machine exits from the predetermined position after the loading work by the excavating machine, coordination between the excavating machine and the hauling machine is essential. If there is no coordination between these excavating machine and another work machine, problems will arise, such that the hauling machine fails to stop at the proper position or the hauling machine fails to start the hauling work at the optimum time.

Patent Literature 1 mentions the excavating machine, which performs excavation and loading work, the excavating machine planning the work in accordance with the environmental information and autonomously executing it. This literature, however, does not mention coordination with a hauling machine to be loaded with excavated materials. In particular, Patent Literature 1 does not assume any case where one of the excavating and hauling machines is a manned work machine and the other is an unmanned work machine.

In view of the above, the present invention aims to provide an unmanned work machine capable of reliably coordinating with a manned work machine and smoothly executing work.

Solution to Problem

To solve the above problems, an unmanned work machine according to the present invention is capable of working in coordination with a manned work machine, and includes: a receiver that receives a notification regarding an operating status of the manned work machine or an operating instruction to the unmanned work machine, the notification being transmitted from the manned work machine by an operation of an operator aboard the manned work machine; and a controller that controls an operation of the unmanned work machine based on the notification received by the receiver.

Advantageous Effects of Invention

An unmanned work machine of the present invention reliably coordinates with the manned work machine, and thus executes the work smoothly.

Other problems, configurations and advantageous effects will be clear from the following descriptions of the embodiments.

DESCRIPTION OF EMBODIMENTS

The following describes some embodiments of the present invention, with reference to the attached drawings. In the following embodiments, components with like numbers indicate like functions unless otherwise mentioned, and their descriptions will be omitted.

Embodiment 1

Figure 1:
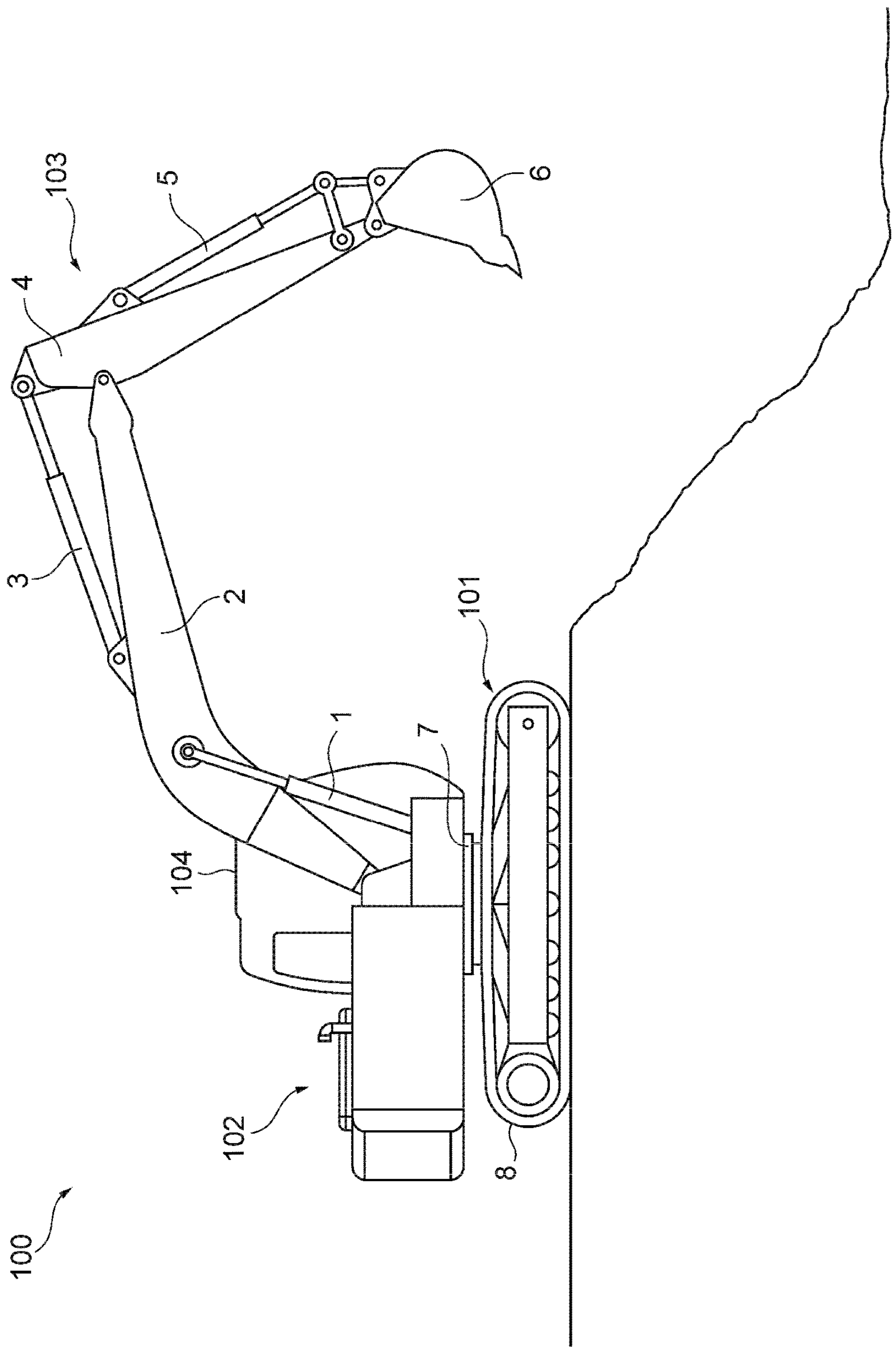
FIG. 1 is a side view showing the configuration of an excavating machine that is an unmanned work machine according to Embodiment 1.

FIG. 1 is a side view showing the configuration of an excavating machine 100 that is an unmanned work machine according to Embodiment 1.

The excavating machine 100 according to the present embodiment is an unmanned work machine capable of autonomously operating without an operator aboard. The excavating machine 100 is an unmanned work machine that performs excavation work of materials and loading work of the excavated materials. For instance, the excavating machine 100 includes a hydraulic excavator.

The excavating machine 100 includes a lower traveling body 101 having a crawler-type traveling device 8, and an upper slewing body 102 mounted on the lower traveling body 101 via a swivel device 7 to be able to swivel. The excavating machine 100 also includes a front working device 103 mounted on the front portion of the upper slewing body 102 to be pivotable in the vertical direction, and a cab 104 mounted on the upper slewing body 102. Note here that the cab 104 is not essential in the excavating machine 100 of the present embodiment.

The front working device 103 includes a boom 2 mounted on the front portion of the upper slewing body 102 to be pivotable in the vertical direction, and an arm 4 connected to the tip of the boom 2 so as to be pivotable in the vertical or front-back direction. The front working device 103 also includes a bucket 6 connected to the tip of the arm 4 to be pivotable in the vertical or front-back direction, a boom cylinder 1 to drive the boom 2, an arm cylinder 3 to drive the arm 4, and a bucket cylinder 5 to drive the bucket 6.

The excavating machine 100 shown in FIG. 1 is a backhoe shovel, and is configured to pull the bucket 6 backward by extending the arm cylinder 3 or the bucket cylinder 5.

Figure 2:
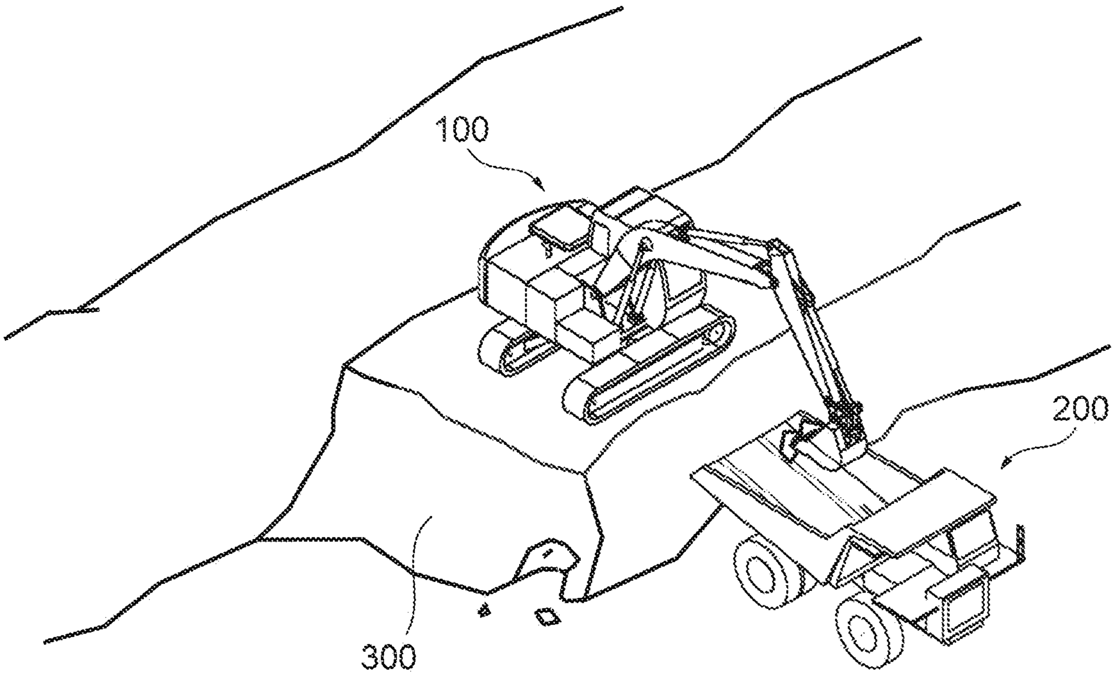
FIG. 2 shows the work site of an excavating machine that is an unmanned work machine and a hauling machine that is a manned work machine.
Figure 3:
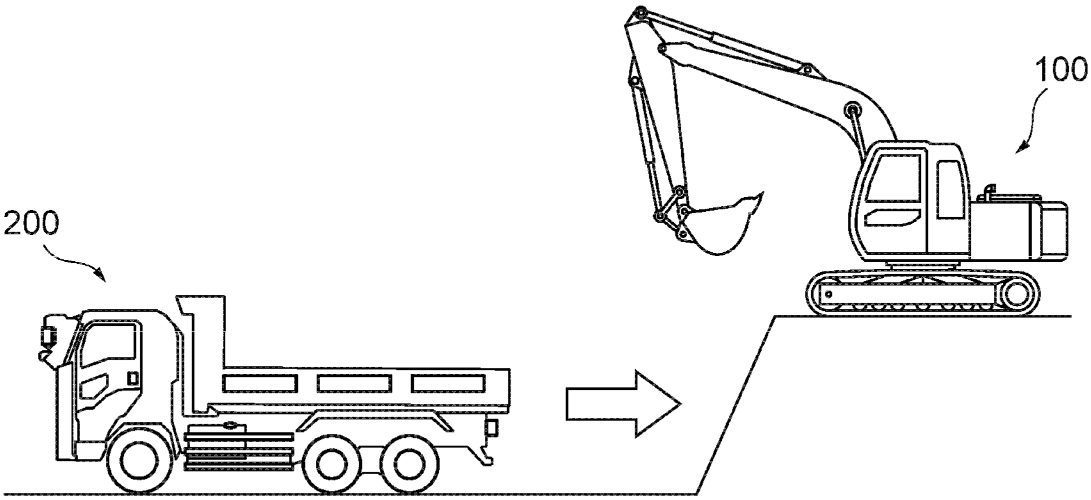
FIG. 3 shows the coordinated work of the excavating machine and the hauling machine shown in FIG. 2.
Figure 3:
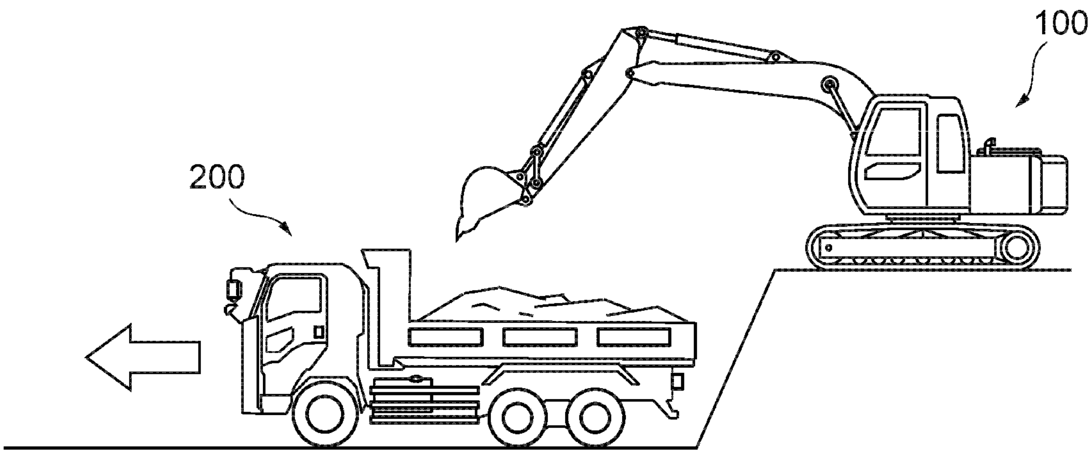

FIG. 2 shows the work site of the excavating machine 100 that is an unmanned work machine and a hauling machine 200 that is a manned work machine. FIG. 3 shows the coordinated work of the excavating machine 100 and the hauling machine 200 shown in FIG. 2.

The excavating machine 100 works in coordination with the hauling machine 200. As shown in FIG. 2, the excavating machine 100 stops above a dig face 300 and excavates the soil from the dig face 300. The excavating machine 100 loads the hauling machine 200 parked at the bottom of the dig face 300 with the soil and other excavated materials. The hauling machine 200 of the present embodiment is a manned work machine, where an operator is aboard to execute the work. The hauling machine 200 is a manned work machine that executes the work of hauling excavated materials loaded by the loading work of the excavating machine 100. For instance, the hauling machine 200 includes a dump truck.

The upper part of FIG. 3 shows how the hauling machine 200 moves toward a predetermined position, which is a stop position of the hauling machine 200, which can be loaded with the excavated materials through the loading work by the excavating machine 100. The lower part of FIG. 3 shows how the hauling machine 200 leaves out of the predetermined position. The hauling machine 200 of the present embodiment moves toward the predetermined position by traveling backward, and leaves the predetermined position by traveling forward. The present invention is not limited to this, and the hauling machine 200 may move toward the predetermined position by traveling forward, and leave the predetermined position by traveling backward.

Figure 4:
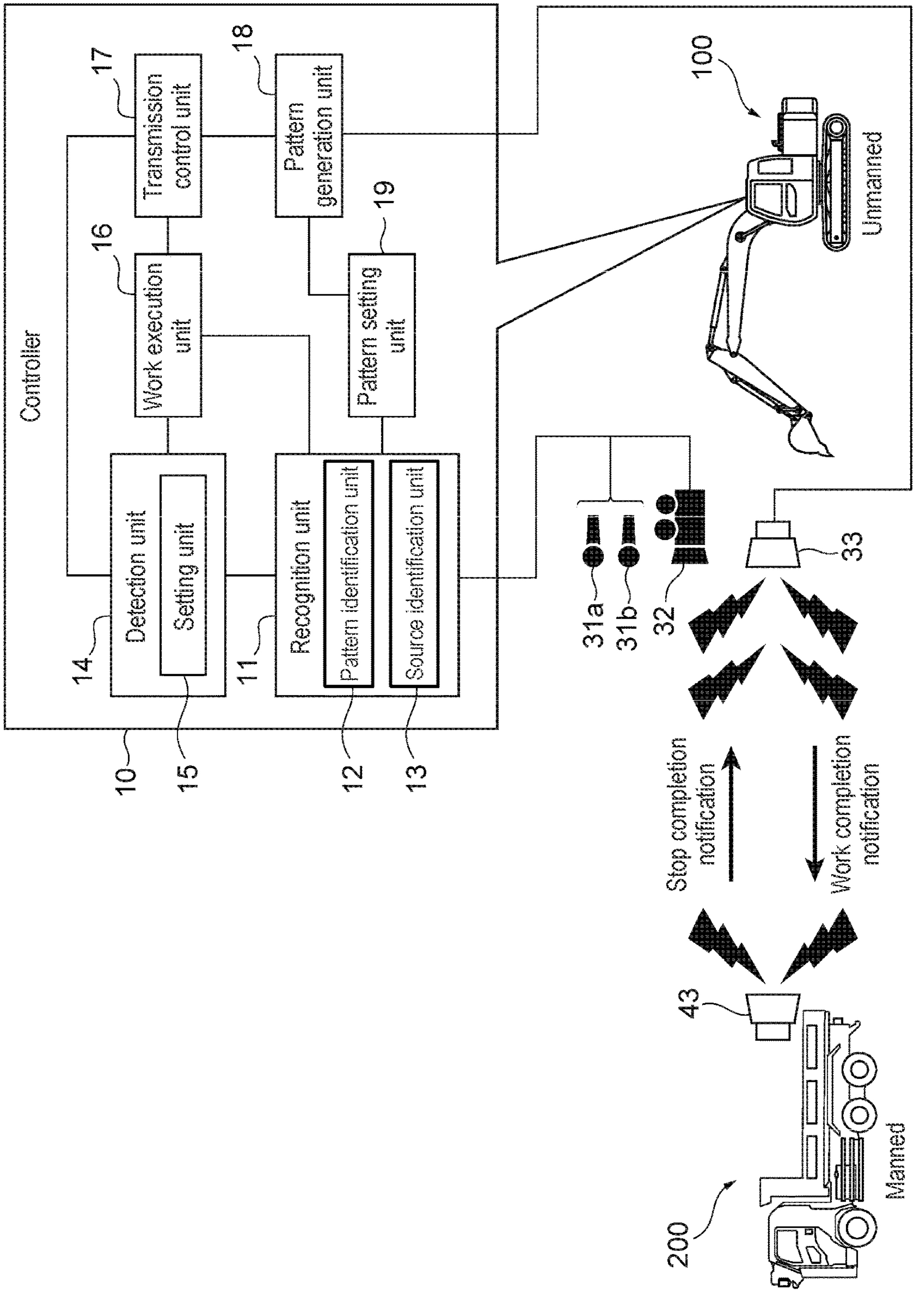
FIG. 4 shows the functional configuration of the excavating machine and the hauling machine shown in FIG. 2.

FIG. 4 shows the functional configuration of the excavating machine 100 and the hauling machine 200 shown in FIG. 2.

The hauling machine 200 transmits a notification regarding the operating status of the hauling machine 200 or an operating instruction to the excavating machine 100. For example, the notifications transmitted from the hauling machine 200 include a stop completion notification and an emergency stop notification. The stop completion notification relates to the operating status of the hauling machine 200, which indicates that the stopping of the hauling machine 200 at the predetermined position has been completed. The emergency stop notification relates to an operation instruction to the excavating machine 100, which instructs the excavating machine 100 to emergently stop the work. For these notifications, the hauling machine 200 emits warning sound from a horn device 43 preinstalled in the hauling machine 200. The warning sound is emitted when an operator aboard the hauling machine 200 operates the horn device 43.

The excavating machine 100 includes sound collectors 31*a* and 31*b* that collect surrounding sound, an imaging device 32 that acquires an image of the surroundings, a horn device 33 that emits warning sound, and a controller 10 that controls the operation of the excavating machine 100.

The sound collectors 31*a* and 31*b* constitute a receiver that receives the warning sound indicating the notification transmitted from the hauling machine 200 in response to the operation of the operator aboard the hauling machine 200. The sound collectors 31*a* and 31*b* transmit collected sound signals to the controller 10. In particular, the sound collectors 31*a*, 31*b* collect the warning sound as the above notification transmitted from the hauling machine 200 and transmit a signal indicating the collected warning sound to the controller 10. The imaging device 32 transmits a signal of the acquired image to the controller 10.

The horn device 33 constitutes a transmitter that transmits a notification regarding the operating status of the excavating machine 100 in the form that the operator aboard the hauling machine 200 can recognize. For example, a work completion notification is a notification regarding the operating status of the excavation machine 100. The work completion notification indicates that the work of loading with excavated materials has been completed. The form that an operator can recognize is a form of the notification that the operator can recognize through their five senses, and a form of sound is used in the present embodiment. The horn device 33 emits warning sound indicating a notification according to the pattern generated by the controller 10. The horn device 33 may emit warning sound indicating a notification regarding the operating status of the hauling machine 200.

Based on the warning sound indicating the notification collected by the sound collectors 31*a* and 31*b* constituting the receiver, the controller 10 controls the operation of the excavating machine 100, which is an unmanned work machine. For example, the controller 10 controls the operation of the front working device 103 and other devices based on the stop completion notification, and causes these devices to perform the excavation work and loading work of excavated materials.

The controller 10 has a recognition unit 11, a detection unit 14, a work execution unit 16, a transmission control unit 17, a pattern generation unit 18, and a pattern setting unit 19.

The recognition unit 11 recognizes patterns of warning sound collected by the sound collectors 31*a* and 31*b*. The recognition unit 11 has a pattern identification unit 12 that identifies patterns of warning sound from the sound collected by the sound collectors 31*a* and 31*b*, and a source identification unit 13 that identifies the source of the warning sound identified by the pattern identification unit 12. The pattern identification unit 12 extracts a predetermined signal waveform of warning sound from the sound signal waveform collected by the sound collectors 31*a* and 31*b* to identify the pattern of the warning sound. The source identification unit 13 calculates the location coordinates of the source of the warning sound based on the difference between the signal waveform of the sound collected by the sound collector 31*a* and the signal waveform of the sound collected by the sound collector 31*b*. The source identification unit 13 compares the location coordinates of the transmission source of the warning sound and the image acquired by the imaging device 32 to identify the hauling machine 200, which is a manned work machine and is the transmission source of the warning sound. This allows the excavating machine 100 to reliably identify the hauling machine 200 as the source of the warning sound, even if there are many hauling machines 200 in the vicinity of the excavating machine 100. The excavating machine 100 reliably determines whether or not the hauling machine 200 stopped at the predetermined position is the hauling machine 200 that is the source of the warning sound. The excavating machine 100 works in coordination with the target hauling machine 200 more reliably even in a work site where there are many hauling machines 200. Note that the source identification unit 13 identifies the hauling machine 200 that is the source of the warning sound, only based on the calculated location coordinates of the source of the warning sound. In particular, if there is only one hauling machine 200 in the vicinity of the excavating machine 100, the source identification unit 13 does not need to compare the location coordinates of the source of the warning sound with the image acquired by the imaging device 32.

The recognition unit 11 transmits the recognition result to the detection unit 14. The recognition result includes the pattern of the warning sound collected by the sound collectors 31*a* and 31*b* and the information about the hauling machine 200 that is the source of the warning sound. The recognition unit 11 transmits the information about the hauling machine 200 that is the source of the warning sound to the work execution unit 16.

Based on the recognition result of the recognition unit 11, the detection unit 14 detects the details of the notification transmitted from the hauling machine 200 that is a manned work machine. The detection unit 14 has a table indicating the correspondence relationship between the warning sound patterns and the details of notifications. The detection unit 14 identifies the notification corresponding to the pattern of the warning sound transmitted from the recognition unit 11 from the table to detect what the notification transmitted from the hauling machine 200 is. If the detected notification involves work by the work execution unit 16, the detection unit 14 transmits the detection result to the work execution unit 16. If the detected notification does not involve work by the work execution unit 16, the detection unit 14 transmits the detection result to the transmission control unit 17. The detection unit 14 is configured to cause the setting unit 15 to change the setting of the correspondence relationship between the warning sound patterns and the details of notifications. This allows the excavating machine 100 to make the setting unit 15 change the settings of the corresponding relationship between the warning sound patterns and the details of notifications easily, even if the corresponding relationship differs at each work site, thus enabling reliable and flexible coordination with the hauling machine 200 at different work sites.

Based on the detection result of the detection unit 14, the work execution unit 16 controls the execution of the work of the excavating machine 100 that is an unmanned work machine. The work execution unit 16 controls the operation of the front working device 103 and other devices according to the notification detected by the detection unit 14, thus controlling the execution of different types of work of the excavating machine 100. For instance, when the notification detected by the detection unit 14 is the stop completion notification as stated above, the work execution unit 16 causes to start the excavation and loading work of the excavated materials. When the notification detected by the detection unit 14 is the emergency stop notification as stated above, the work execution unit 16 causes to stop the work emergently. When the loading work is completed, the work execution unit 16 notifies the transmission control unit 17 accordingly.

The transmission control unit 17 controls the transmission of warning sound. Based on the detection result of the detection unit 14 and the progress of the work by the work execution unit 16, the transmission control unit 17 determines the notification to be transmitted from the excavating machine 100 and the timing of the transmission. The transmission control unit 17 transmits a control signal instructing the notification to be transmitted and the timing of transmission to the pattern generation unit 18. For example, when the work execution unit 16 completes the loading work, the transmission control unit 17 transmits a control signal to the pattern generation unit 18, instructing it to immediately transmit the work completion notification as stated above.

The pattern generation unit 18 generates a warning sound pattern to be transmitted from the horn device 33 in accordance with the control signal transmitted from the transmission control unit 17. The warning sound pattern is set in advance for each notification to be transmitted. Multiple patterns of warning sound are generated by setting the amplitude and frequency of a signal waveform appropriately to have different pitches, sounding durations, and numbers of soundings. When transmitting the work completion notification as stated above, the pattern generation unit 18 generates a preset pattern that is a pattern of the warning sound indicating the work completion notification. The pattern generation unit 18 transmits a drive signal for the horn device 33 according to the generated warning sound pattern to the horn device 33.

The pattern setting unit 19 selects patterns of warning sound generated by the pattern generation unit 18 and patterns of warning sound recognized by the recognition unit 11 from a plurality of predetermined patterns of warning sound, and sets the selected patterns in the pattern generation unit 18 and the recognition unit 11. The pattern setting unit 19 is able to freely set and change the types and number of warning sound patterns generated by the pattern generation unit 18 and the types and number of warning sound patterns recognized by the recognition unit 11 within a predetermined range. This allows the excavating machine 100 to transmit and receive different types of notifications by selectively using multiple warning sound patterns. The excavating machine 100 exchanges different operating statuses of the excavating machine 100 and the hauling machine 200 with the hauling machine 200, enabling more reliable and firm coordination with the hauling machine 200 at different work sites.

Figure 5:
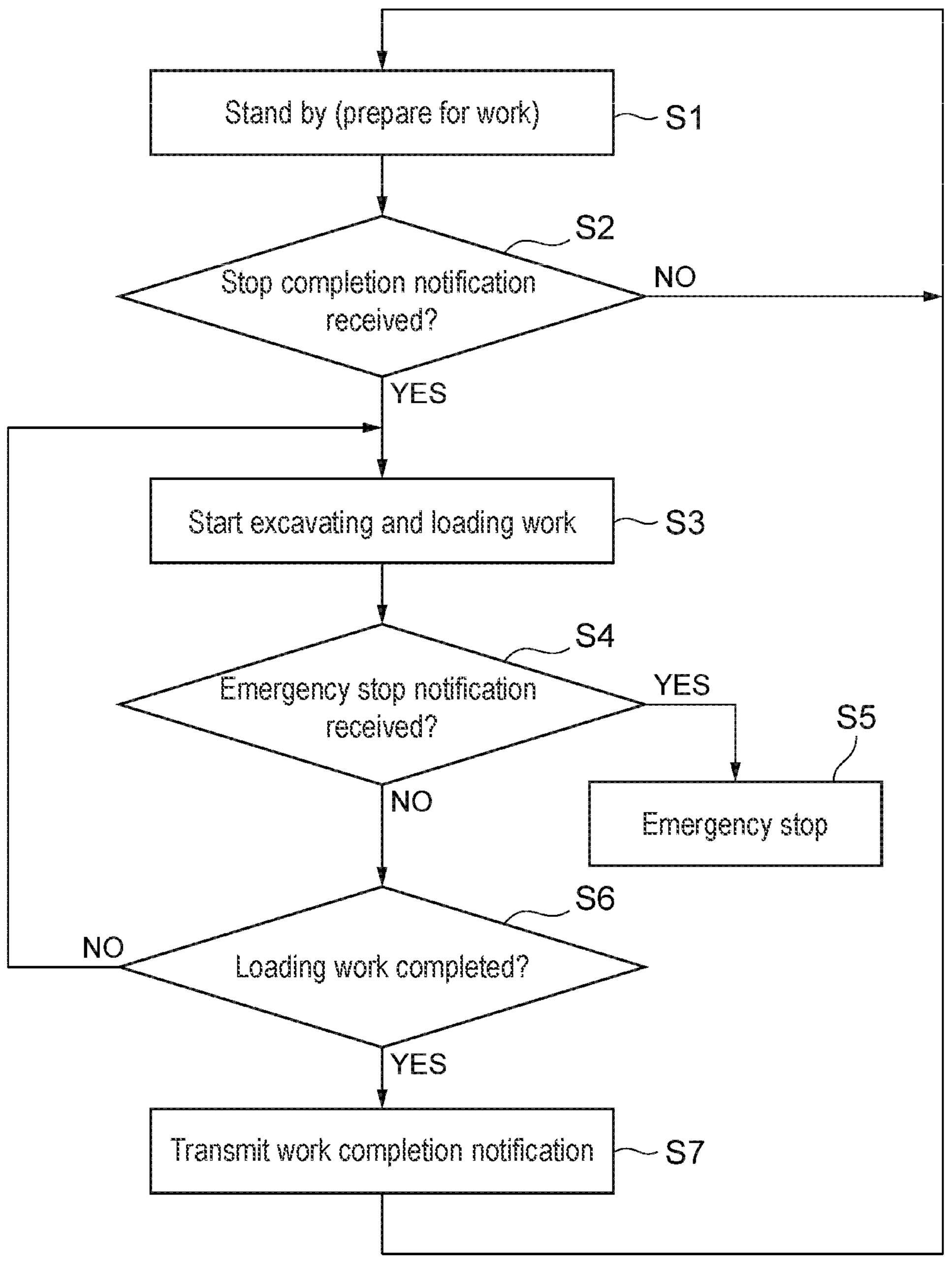
FIG. 5 is a flowchart showing the flow of processing performed by the excavating machine in the coordinated work between the excavating machine and the hauling machine shown in FIG. 4.

FIG. 5 is a flowchart showing the flow of processing performed by the excavating machine 100 in the coordinated work between the excavating machine 100 and the hauling machine 200 shown in FIG. 4.

In step S1, the excavating machine 100 prepares for excavating work and loading work and stands by in an operable state.

In step S2, the excavating machine 100 determines whether or not it has received a stop completion notification transmitted from the hauling machine 200. If the excavating machine 100 has not received a stop completion notification, the excavating machine 100 shifts to step S1. If the excavating machine 100 has received a stop completion notification, the excavating machine 100 shifts to step S3.

In step S3, the excavating machine 100 starts excavating work and loading work of the excavated materials. Note that the excavating machine 100 may start at least the loading work in response to the stop completion notification. The excavating machine 100 may start the excavating work before receiving the stop completion notification.

In step S4, the excavating machine 100 determines whether or not it has received an emergency stop notification. If the excavating machine 100 has not received an emergency stop notification, the excavating machine 100 shifts to step S6. If the excavating machine 100 has received an emergency stop notification, it determines that the operating statuses is abnormal, and the excavating machine 100 shifts to step S5.

In step S5, the excavating machine 100 stops the work of the excavating machine 100 emergently based on the received emergency stop notification. The emergency stop notification may have been transmitted due to an error by an operator aboard the hauling machine 200. To address this possibility, if the warning sound is not emitted from the hauling machine 200 within a predetermined time elapsed after step S4, the excavating machine 100 may shift to step S6.

In step S6, the excavating machine 100 determines whether or not the loading work has been completed. The excavating machine 100 determines whether or not the loading work has been completed by performing image recognition of the image of the loaded amount on the hauling machine 200 acquired by the imaging device 32. For example, if the loaded amount on the hauling machine 200 is at its maximum loading capacity, the excavating machine 100 may determine that the loading work has been completed, and if the loaded amount on the hauling machine 200 is not at its maximum loading capacity, the excavating machine 100 may determine that the loading work has not been completed. If the loading work has not been completed, the excavating machine 100 shifts to step S3. If the loading work has been completed, the excavating machine 100 shifts to step S7.

In step S7, the excavating machine 100 transmits a work completion notification. After that, the excavating machine 100 shifts to step S1.

Figure 6:
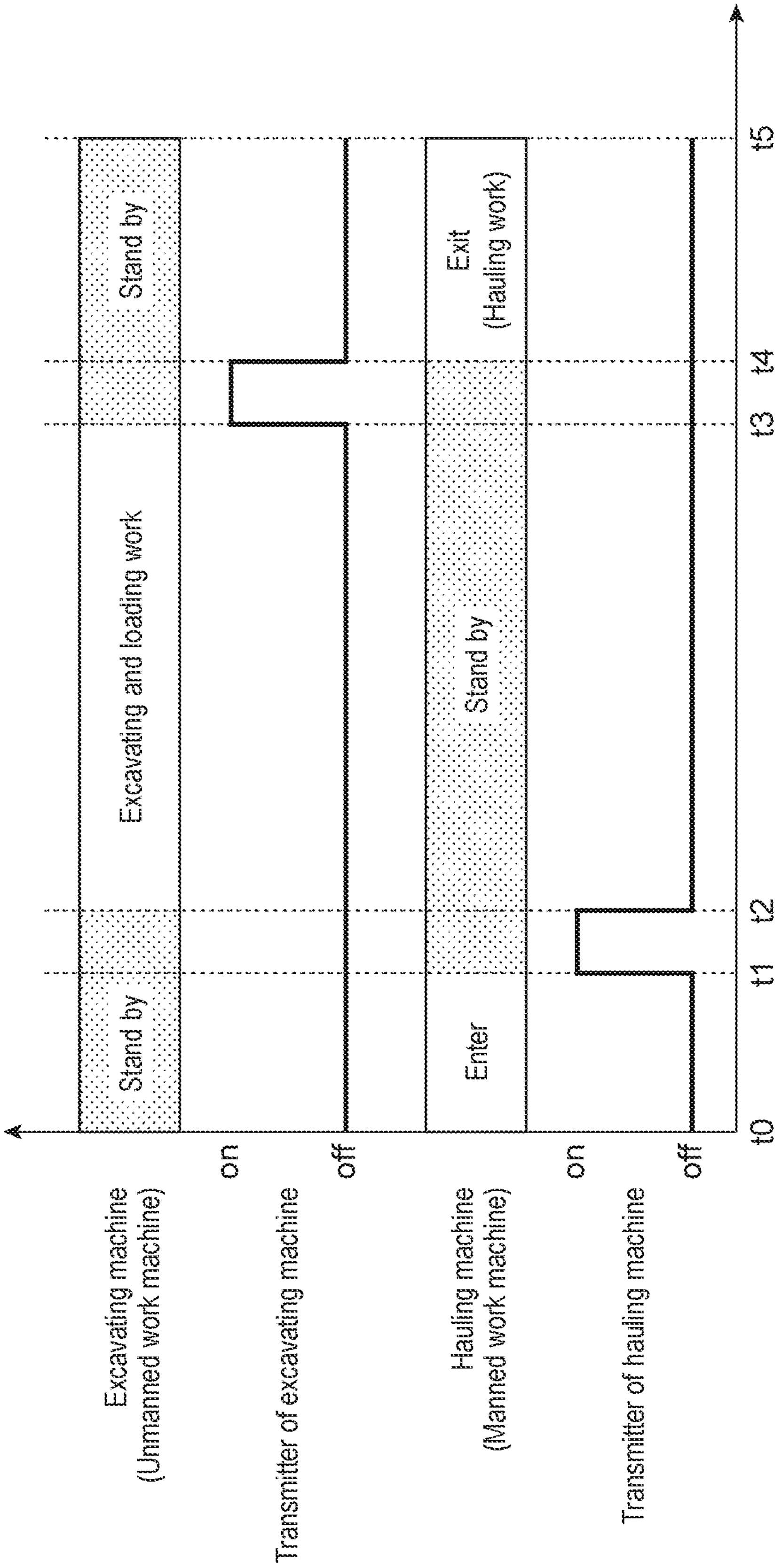
FIG. 6 is a time chart of the coordinated work of the excavating machine and the hauling machine shown in FIG. 4.

FIG. 6 is a time chart of the coordinated work of the excavating machine 100 and the hauling machine 200 shown in FIG. 4.

At time t0, the hauling machine 200 enters the work site and moves toward the predetermined position, which is the stopping position of the hauling machine 200 that can be loaded with excavated materials. The hauling machine 200 continues the moving operation until it completes the stopping at the predetermined position (time t1). At time t0, the excavating machine 100 prepares for excavating work and loading work and waits until it receives a stop completion notification from the hauling machine 200 (time t2).

At time t1, the hauling machine 200 completes the stopping at the predetermined position. To transmit a stop completion notification, the hauling machine 200 drives the horn device 43, which is the transmitter of the hauling machine 200. After that, the hauling machine 200 prepares to leave the predetermined position and waits until it receives a work completion notification from the excavating machine 100 (time t4).

At time t2, the excavating machine 100 receives a stop completion notification from the hauling machine 200. The excavating machine 100 starts excavating work and loading work of the excavated materials. The excavating machine 100 continues the excavating work and loading work until the loading work has been completed (time t3).

At time t3, the excavating machine 100 completes the loading work. To transmit a work completion notification, the excavating machine 100 drives the horn device 33, which is the transmitter of the excavating machine 100. After that, the excavating machine 100 waits until another hauling machine 200 stops at the predetermined position and the excavating machine 100 receives a stop completion notification from the hauling machine.

At time t4, the hauling machine 200 receives a work completion notification from the excavating machine 100. The hauling machine 200 starts to exit from the predetermined position and leaves the work site. That is, the hauling machine 200 starts the hauling work. The hauling machine 200 continues the exit operation until the exit from the predetermined position is completed (time t5).

As described above, the excavating machine 100 of Embodiment 1 is an unmanned work machine that works autonomously in coordination with the hauling machine 200 that is a manned work machine. The excavating machine 100 of Embodiment 1 includes a receiver that receives a notification regarding the operating status of the hauling machine 200 or an operating instruction to the excavating machine 100, which are transmitted from the hauling machine 200 in response to the operation by an operator aboard the hauling machine 200. The excavating machine 100 of Embodiment 1 includes the controller 10 that controls the operation of the excavating machine 100 in accordance with the received notification as stated above.

This allows the excavating machine 100 of Embodiment 1 to share the operating status of the hauling machine 200 and an operating instruction to the excavating machine 100, which are understood by the operator aboard the hauling machine 200, and execute appropriate operations corresponding to the operating status and operating instruction. Therefore, the excavating machine 100 of Embodiment 1, which is an unmanned work machine, reliably coordinates with the hauling machine 200 that is a manned work machine, and smoothly executes work.

The excavating machine 100 of Embodiment 1 includes a transmitter that transmits a notification regarding the operating status of the excavating machine 100 in a form that the operator aboard the hauling machine 200 can recognize.

This allows the excavating machine 100 of Embodiment 1 to share the operating status of the excavating machine 100, which is understood by the excavating machine 100, with the hauling machine 200, and prompt the operator aboard the hauling machine 200 to perform an appropriate action corresponding to the operating status. The excavating machine 100 of Embodiment 1 therefore reliably coordinates with the hauling machine 200 that is a manned work machine, and thus executes the work smoothly.

Furthermore, the excavating machine 100 of Embodiment 1 receives a stop completion notification indicating that stopping of the hauling machine 200 has been completed at the predetermined position, and starts the loading work in accordance with the received stop completion notification.

This allows the excavating machine 100 of Embodiment 1 to prevent the loading work from being executed before the stopping of the hauling machine 200 has been completed at the predetermined position. The excavating machine 100 of Embodiment 1 therefore reliably coordinates with the hauling machine 200 that is a manned work machine, and thus executes the work smoothly.

Furthermore, the excavating machine 100 of Embodiment 1 transmits a work completion notification indicating that the loading work has been completed.

This allows the excavating machine 100 of Embodiment 1 to prevent the hauling machine 200 from executing the exit operation before the loading work by the excavating machine 100 has been completed. The excavating machine 100 of Embodiment 1 therefore reliably coordinates with the hauling machine 200 that is a manned work machine, and thus executes the work smoothly.

Furthermore, the hauling machine 200 of Embodiment 1 emits warning sound as a notification from the hauling machine 200. In the excavating machine 100 of Embodiment 1, the receiver includes the sound collectors 31*a* and 31*b* that collect the warning sound. In the excavating machine 100 of Embodiment 1, the controller 10 includes the recognition unit 11 that recognizes a pattern of the warning sound collected by the sound collectors 31*a* and 31*b*, and the detection unit 14 that detects the details of the notification transmitted from the hauling machine 200 based on the recognition result of the recognition unit 11. In the excavating machine 100 of Embodiment 1, the controller 10 also has the work execution unit 16 that controls the execution of the work of the excavating machine 100 based on the detection result of the detection unit 14.

This allows the excavating machine 100 of Embodiment 1 to exchange information with the hauling machine 200 using the warning sound of the horn device 43 that the hauling machine 200 typically includes. The excavating machine 100 of Embodiment 1 exchanges information with the hauling machine 200 without the need of any additional special device to the hauling machine 200 that is a manned work machine. The excavating machine 100 of Embodiment 1 therefore reliably and easily coordinates with the hauling machine 200 that is a manned work machine, and thus executes the work smoothly.

The excavating machine 100 of Embodiment 1 also includes the imaging device 32 that acquires an image of the surroundings. In the excavating machine 100 of Embodiment 1, the recognition unit 11 identifies the hauling machine 200, which is the source of the warning sound, based on the warning sound collected by the sound collectors 31*a* and 31*b* and the image acquired by the imaging device 32.

This allows the excavating machine 100 of Embodiment 1 to easily identify the hauling machine 200 as the source of the warning sound, even if there are many hauling machines 200 in the vicinity of the excavating machine 100. The excavating machine 100 of Embodiment 1 therefore works in coordination with the target hauling machine 200 more reliably even in a work site where there are many hauling machines 200, and thus executes the work smoothly.

In the excavating machine 100 of Embodiment 1, the transmitter includes the horn device 33 that emits warning sound as a notification from the excavating machine 100. In the excavating machine 100 of Embodiment 1, the controller 10 includes the pattern setting unit 19 that selects patterns of warning sound generated by the horn device 33 and patterns of warning sound recognized by the recognition unit 11 from a plurality of predetermined patterns of warning sound, and sets the selected patterns.

This allows the excavating machine 100 of Embodiment 1 to exchange various notifications with the hauling machine 200 about the details on their respective operating statuses using multiple patterns of warning sound correctly. The excavating machine 100 of Embodiment 1 therefore reliably and firmly coordinates with the hauling machine 200 at different work sites, and thus executes the work smoothly.

In the excavating machine 100 of Embodiment 1, the receiver receives an emergency stop notification instructing the excavating machine 100 to stop its work emergently, and then the controller 10 emergently stops the work of the excavating machine 100 in accordance with the received emergency stop notification.

This allows the excavating machine 100 of Embodiment 1 to emergently stop the work of the excavating machine 100 if the operator aboard the hauling machine 200 finds an abnormality of the excavating machine 100. The excavating machine 100 of Embodiment 1 gives a sense of security to the operator aboard the hauling machine 200, and prompts the operator to coordinate the excavating machine 100 with the hauling machine 200. The excavating machine 100 of Embodiment 1 therefore reliably and smoothly coordinates with the hauling machine 200 that is a manned work machine, and thus executes the work smoothly.

The excavating machine 100 and the hauling machine 200 of Embodiment 1 implement their coordination using warning sound. The excavating machine 100 and the hauling machine 200 may implement their coordination using the light of warning and illumination lights that these machines typically have. For instance, the hauling machine 200 may transmit a stop completion notification by blinking the hazard lamp of the hauling machine 200. The excavating machine 100 then acquires an image of the blinking hazard lamp of the hauling machine 200 by the imaging device 32 and performs image recognition on this image to understand that stopping of the hauling machine 200 has been completed at the predetermined position. For instance, the excavating machine 100 may transmit a work completion notification by blinking the illumination light of the excavating machine 100. Seeing the blinking illumination light of the excavating machine 100, the operator of the hauling machine 200 understands that the loading work of the excavating machine 100 has been completed.

That is, the transmitter of the hauling machine 200 may include not only the horn device 43 but also a lamp such as the illumination light or warning light that the hauling machine 200 typically has. The transmitter of the excavating machine 100 may include not only the horn device 33 but also a lamp such as the illumination light or warning light that the excavating machine 100 typically has. The receiver of the excavating machine 100 may include not only the sound collectors 31*a*, 31*b* but also the imaging device 32. In the controller 10 of the excavating machine 100, the recognition unit 11 may recognize a blinking pattern of the lamp light from the hauling machine 200, and the detection unit 14 may detect the details of the notification based on the recognition result of the blinking pattern of the lamp light. The pattern generation unit 18 and the pattern setting unit 19 also may be implemented by replacing the warning sound patterns with the lamp light blinking patterns.

Embodiment 2

Figure 7:
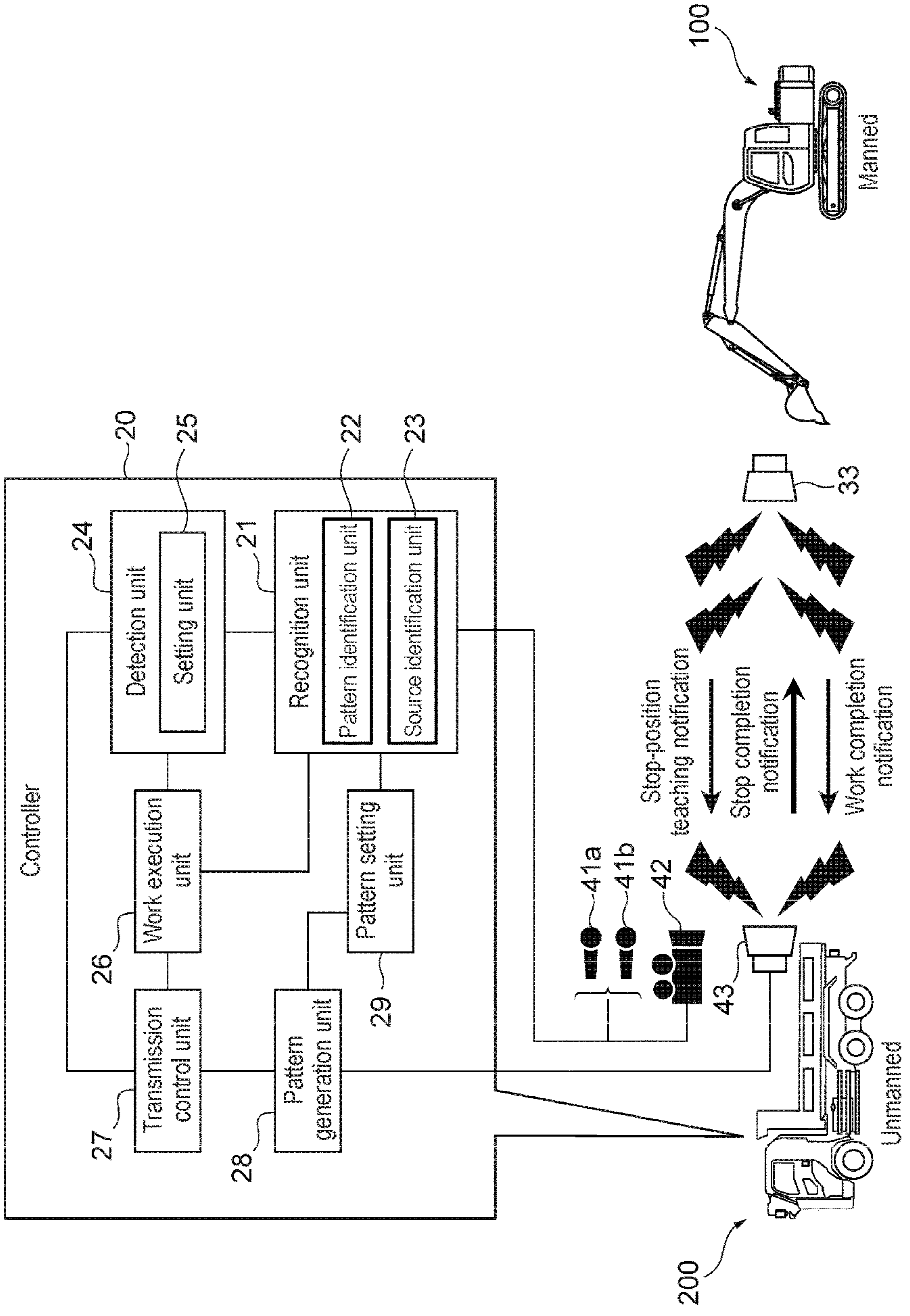
FIG. 7 shows the functional configuration of an excavating machine that is a manned work machine and a hauling machine that is an unmanned work machine according to Embodiment 2.
Figure 8:
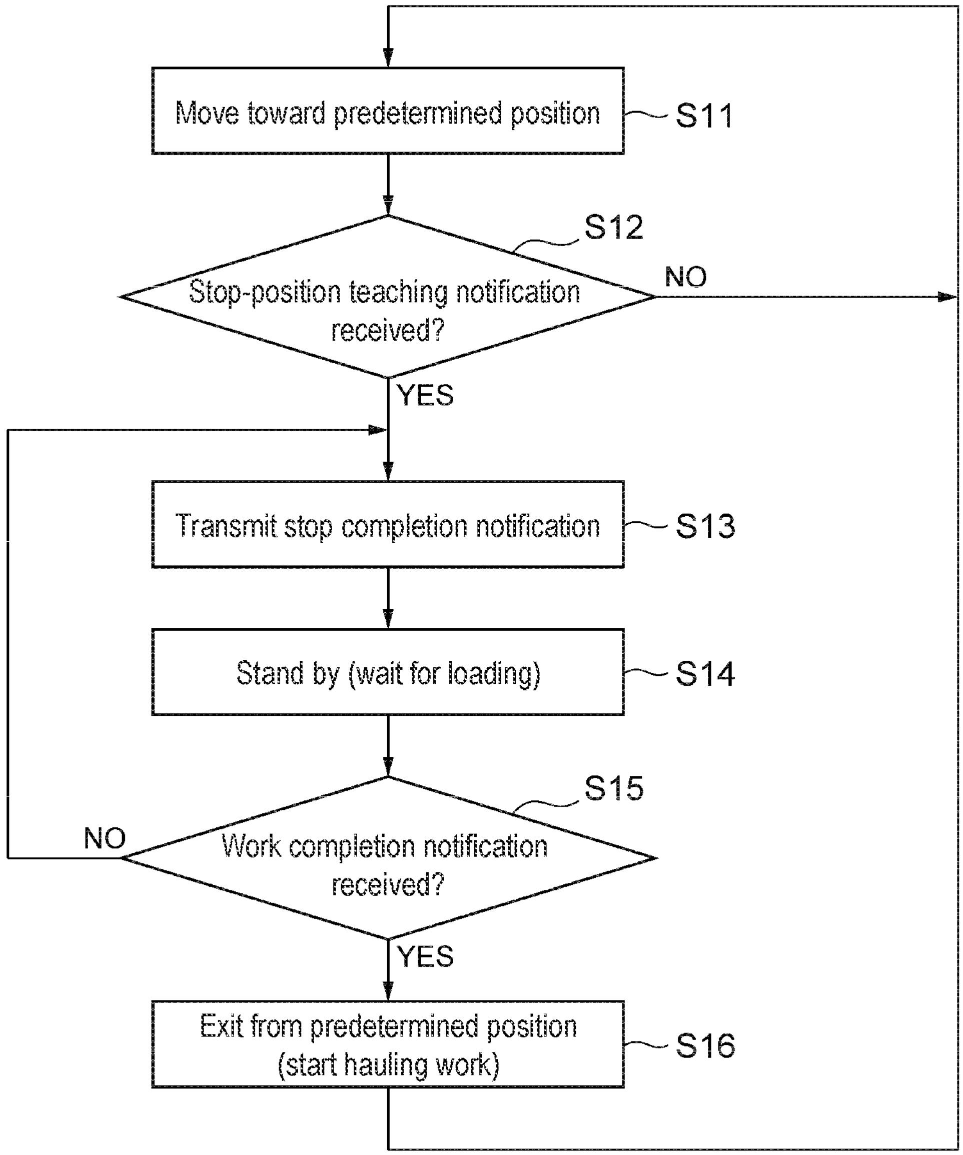
FIG. 8 is a flowchart showing the flow of processing performed by the hauling machine in the coordinated work between the excavating machine and the hauling machine shown in FIG. 7.
Figure 9:
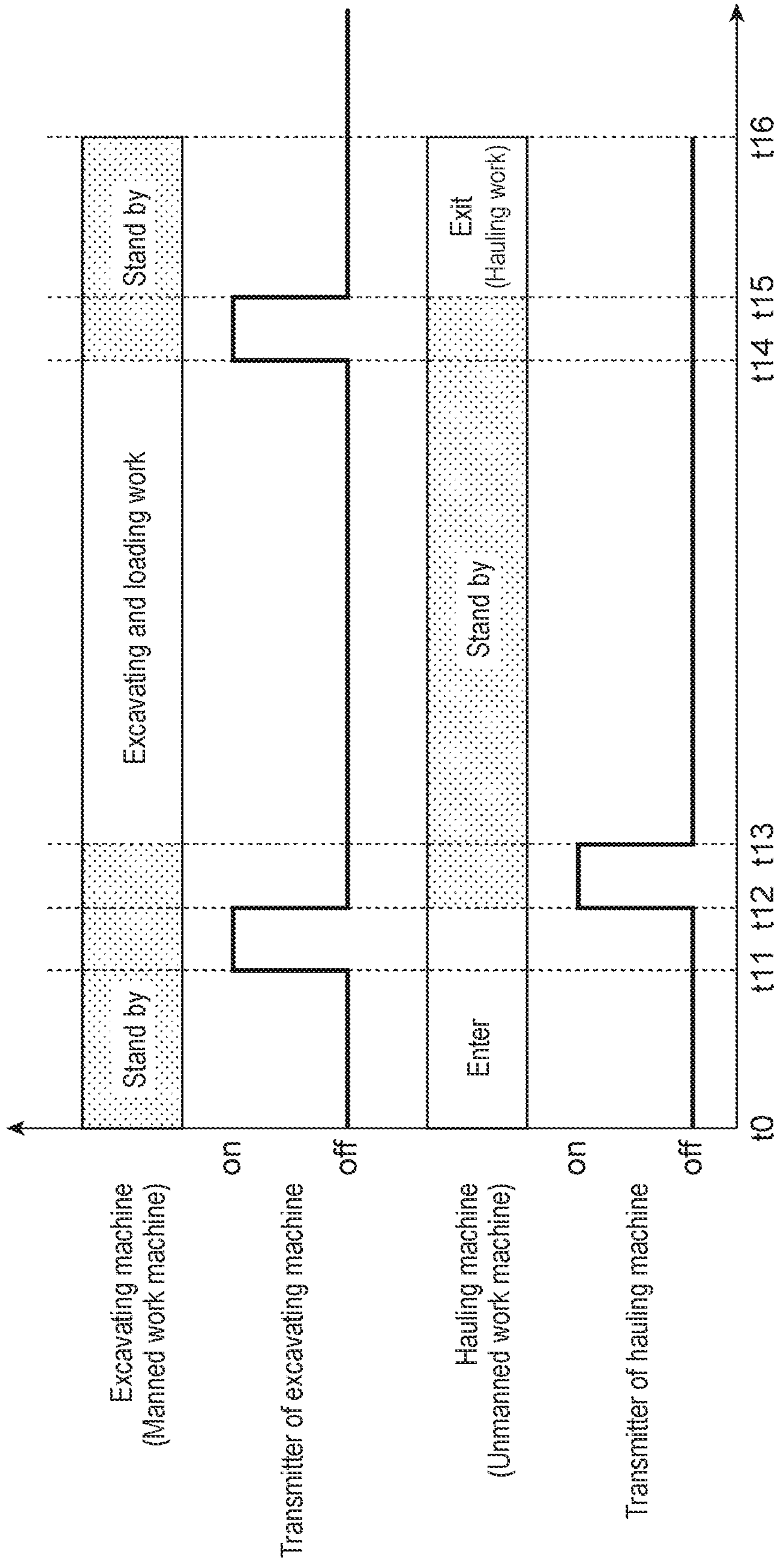
FIG. 9 is a time chart of the coordinated work of the excavating machine and the hauling machine shown in FIG. 7.

Referring to FIGS. 7 to 9, the following describes an unmanned work machine according to Embodiment 2. The following descriptions on Embodiment 2 omit the descriptions on similar configurations and operations to Embodiment 1.

FIG. 7 shows the functional configuration of an excavating machine 100 that is a manned work machine and a hauling machine 200 that is an unmanned work machine according to Embodiment 2.

In Embodiment 1, the excavating machine 100 is an unmanned work machine and the hauling machine 200 is a manned work machine. In Embodiment 2, the hauling machine 200 is an unmanned work machine and the excavating machine 100 is a manned work machine.

The excavating machine 100 of Embodiment 2 transmits a notification regarding the operating status of the excavating machine 100 or an operating instruction to the hauling machine 200. For example, the notifications transmitted from the excavating machine 100 of Embodiment 2 include a work completion notification and a stop-position teaching notification. The work completion notification is the same as in Embodiment 1. The stop-position teaching notification relates to an operating instruction to the hauling machine 200, which teaches the hauling machine 200 that is an unmanned work machine to stop at the predetermined position. For the notification, the excavating machine 100 emits warning sound from the horn device 33 preinstalled in the excavating machine 100. The warning sound is emitted when an operator aboard the excavating machine 100 operates the horn device 33.

The hauling machine 200 of Embodiment 2 transmits a notification regarding the operating status of the hauling machine 200. For instance, the notifications transmitted from the hauling machine 200 of Embodiment 2 include a stop completion notification similar to Embodiment 1. For the notification, the hauling machine 200 emits warning sound from the horn device 43.

The hauling machine 200 of Embodiment 2 includes sound collectors 41*a* and 41*b* that collect surrounding sound, an imaging device 42 that acquires an image of the surroundings, the horn device 43 that emits warning sound, and a controller 20 that controls the operation of the hauling machine 200.

The sound collectors 41*a* and 41*b* constitute a receiver that receives the warning sound indicating the notification transmitted from the excavating machine 100 in response to the operation of the operator aboard the excavating machine 100. The sound collectors 41*a* and 41*b* transmit collected sound signals to the controller 20. Other configurations of the sound collectors 41*a* and 41*b* are similar to the sound collectors 31*a* and 31*b* of Embodiment 1.

The horn device 43 constitutes a transmitter that transmits a notification regarding the operating status of the hauling machine 200 in the form that the operator aboard the excavating machine 100 can recognize. The horn device 43 emits warning sound indicating a notification according to the pattern generated by the controller 20. Other configurations of the horn device 43 are similar to the horn device 33 of Embodiment 1.

Based on the warning sound indicating the notification collected by the sound collectors 41*a* and 41*b* constituting the receiver, the controller 20 controls the operation of the hauling machine 200 that is an unmanned work machine. For example, based on the stop-position teaching notification, the controller 20 controls the operations of the accelerator device, the braking device, the steering device, and other devices of the hauling machine 200 to execute the entering and stopping operation at the predetermined position. Then, the controller 20 drives the horn device 43 to transmit a stop completion notification. For example, based on a work completion notification, the controller 20 controls the operations of the accelerator device, the braking device, the steering device, and other devices of the hauling machine 200 to execute the exit operation (hauling work) from the predetermined position.

The controller 20 has a recognition unit 21, a detection unit 24, a work execution unit 26, a transmission control unit 27, a pattern generation unit 28, and a pattern setting unit 29. These recognition unit 21, detection unit 24, work execution unit 26, transmission control unit 27, pattern generation unit 28, and pattern setting unit 29 are similar to the recognition unit 11, detection unit 14, work execution unit 16, transmission control unit 17, pattern generation unit 18, and pattern setting unit 19 of Embodiment 1, respectively.

FIG. 8 is a flowchart showing the flow of processing performed by the hauling machine 200 in the coordinated work between the excavating machine 100 and the hauling machine 200 shown in FIG. 7.

In step S11, the hauling machine 200 moves toward the predetermined position, which is the stopping position of the hauling machine 200 that can be loaded with excavated materials.

In step S12, the hauling machine 200 determines whether or not it has received a stop-position teaching notification transmitted from the excavating machine 100. If the hauling machine 200 has not received a stop-position teaching notification, the hauling machine 200 shifts to step S11. If the hauling machine 200 has received a stop-position teaching notification, the hauling machine 200 shifts to step S13.

In step S13, the hauling machine 200 stops at the predetermined position, and transmits a stop completion notification.

In step S14, the hauling machine 200 prepares to exit from the predetermined position and waits until the loading work with excavated materials has been completed.

In step S15, the hauling machine 200 determines whether or not it has received a work completion notification transmitted from the excavating machine 100. If the excavating machine 200 has not received a work completion notification, the excavating machine 200 shifts to step S13. If the excavating machine 200 has received a work completion notification, the excavating machine 200 shifts to step S16.

In step S16, the hauling machine 200 exits from the predetermined position. That is, the hauling machine 200 starts the hauling work. After that, the hauling machine 200 shifts to step S11.

FIG. 9 is a time chart of the coordinated work of the excavating machine 100 and the hauling machine 200 shown in FIG. 7.

At time t0, the hauling machine 200 enters the work site and moves toward the predetermined position, which is the stopping position of the hauling machine 200 that can be loaded with excavated materials. The hauling machine 200 continues the entry operation until it receives a stop-position teaching notification from the excavating machine 100 (time t12). At time t0, the excavating machine 100 prepares for excavating work and loading work and waits until the hauling machine 200 moves toward around the predetermined position (time t11).

At time t11, the hauling machine 200 moves toward around the predetermined position. To transmit a stop-position teaching notification, the excavating machine 100 drives the horn device 33, which is the transmitter of the excavating machine 100. After that, the excavating machine 100 waits until it receives a stop completion notification from the hauling machine 200 (time t13).

At time t12, the hauling machine 200 completes the stopping at the predetermined position. To transmit a stop completion notification, the hauling machine 200 drives the horn device 43, which is the transmitter of the hauling machine 200. After that, the hauling machine 200 prepares to leave the predetermined position and waits until it receives a work completion notification from the excavating machine 100 (time t15).

At time t13, the excavating machine 100 receives a stop completion notification from the hauling machine 200. The excavating machine 100 starts excavating work and loading work of the excavated materials. The excavating machine 100 continues the excavating work and loading work until the loading work has been completed (time t14).

At time t14, the excavating machine 100 completes the loading work. To transmit a work completion notification, the excavating machine 100 drives the horn device 33, which is the transmitter of the excavating machine 100. After that, the excavating machine 100 waits until another hauling machine 200 moves toward around the predetermined position.

At time t15, the hauling machine 200 receives a work completion notification from the excavating machine 100. The hauling machine 200 starts to exit from the predetermined position and leaves the work site. That is, the hauling machine 200 starts the hauling work. The hauling machine 200 continues the exit operation until the exit from the predetermined position is completed (time t16).

As described above, the hauling machine 200 of Embodiment 2 is an unmanned work machine that works autonomously in coordination with the excavating machine 100 that is a manned work machine. The hauling machine 200 of Embodiment 2 includes a receiver that receives a notification regarding the operating status of the excavating machine 100 or an operating instruction to the hauling machine 200, which are transmitted from the excavating machine 100 in response to the operation by an operator aboard the excavating machine 100. The hauling machine 200 of Embodiment 2 includes the controller 20 that controls the operation of the hauling machine 200 in accordance with the received notification as stated above.

This allows the hauling machine 200 of Embodiment 2 to share the operating status of the excavating machine 100 and an operating instruction to the hauling machine 200, which are understood by the operator aboard the excavating machine 100, and execute appropriate operations corresponding to the operating status. Therefore, the hauling machine 200 of Embodiment 2, which is an unmanned work machine, reliably coordinates with the excavating machine 100 that is a manned work machine, and smoothly executes work.

Furthermore, in the hauling machine 200 of Embodiment 2, the receiver receives a work completion notification indicating that the loading work by the excavating machine 100 has been completed, and the controller 20 starts the hauling work in accordance with the received work completion notification.

This allows the hauling machine 200 of Embodiment 2 to prevent the hauling work from being executed before the loading work of the excavating machine 100 has been completed. The hauling machine 200 of Embodiment 2 therefore reliably coordinates with the excavating machine 100 that is a manned work machine, and thus executes the work smoothly.

Furthermore, in the hauling machine 200 of Embodiment 2, the receiver receives a stop-position teaching notification teaching the hauling machine 200 stopping at the predetermined position, and the controller 20 controls the hauling machine 200 to stop at the predetermined position in accordance with the received stop-position teaching notification. In the hauling machine 200 of Embodiment 2, the transmitter transmits a stop completion notification indicating that the stopping of the hauling machine 200 at the predetermined position has been completed.

This allows the hauling machine 200 of Embodiment 2 to stop at the predetermined position reliably, and also prevents the excavating machine 100 from executing loading work before the stopping of the hauling machine 200 has been completed at the predetermined position. The hauling machine 200 of Embodiment 2 therefore reliably coordinates with the excavating machine 100 that is a manned work machine, and thus executes the work smoothly.

Embodiment 3

Referring to FIGS. 10 to 13, the following describes an unmanned work machine according to Embodiment 3. The following descriptions on Embodiment 3 omit the descriptions on similar configurations and operations to Embodiments 1 to 2.

Figure 10:
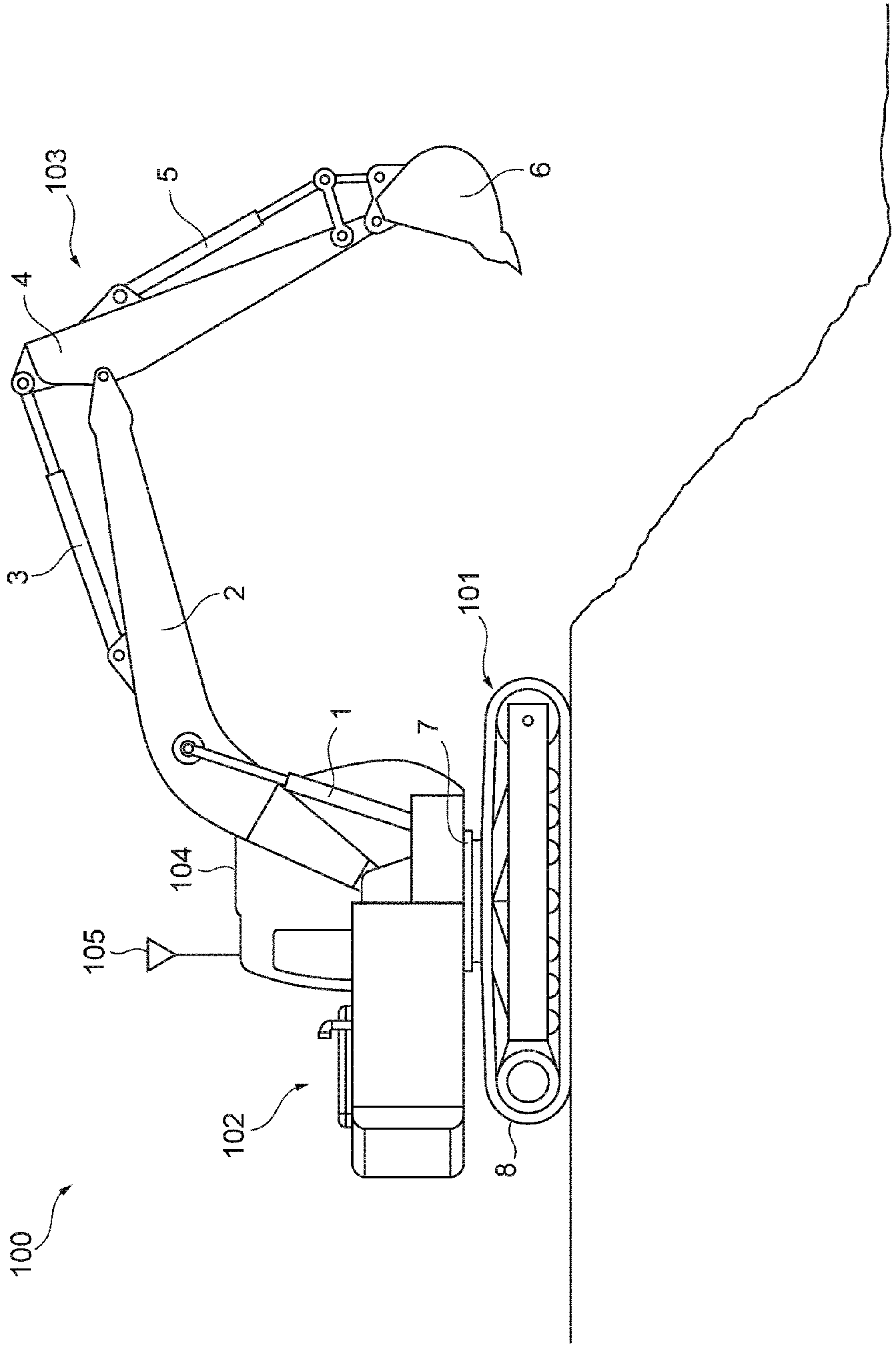
FIG. 10 is a side view showing the configuration of an excavating machine that is an unmanned work machine according to Embodiment 3.

FIG. 10 is a side view showing the configuration of an excavating machine 100 that is an unmanned work machine according to Embodiment 3.

The excavating machine 100 according to Embodiment 3 is an unmanned work machine that operates by remote control without an operator aboard. The excavating machine 100 is an unmanned work machine that performs excavation work of materials and loading work of the excavated materials. The hauling machine 200 of Embodiment 3 is a manned work machine, where an operator is aboard to execute the work. The hauling machine 200 is a manned work machine that executes the work of hauling excavated materials loaded by the loading work of the excavating machine 100.

Similar to Embodiment 1, the excavating machine 100 includes a lower traveling body 101 having a traveling device 8, an upper slewing body 102 mounted on the lower traveling body 101 via a swivel device 7 to be able to swivel, a front working device 103 mounted on the front portion of the upper slewing body 102, and a cab 104 mounted on the upper slewing body 102. The excavating machine 100 of Embodiment 3 also includes a communication device 105 that communicates with a remote control room 400. Note here that the cab 104 is not essential in the excavating machine 100 of the present embodiment.

Figure 11:
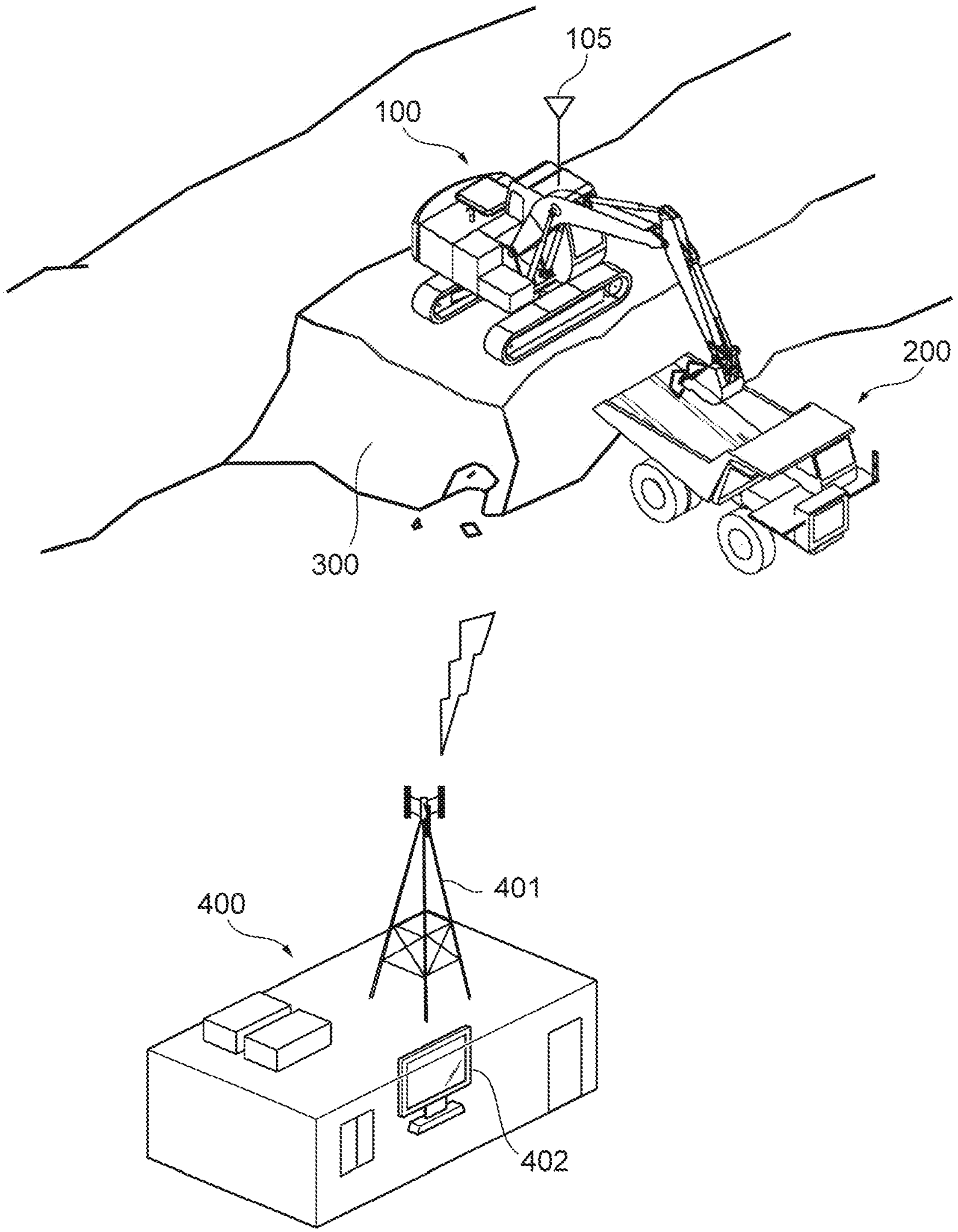
FIG. 11 shows the work site of the excavating machine that is an unmanned work machine and the hauling machine that is a manned work machine, and the remote control room.
Figure 12:
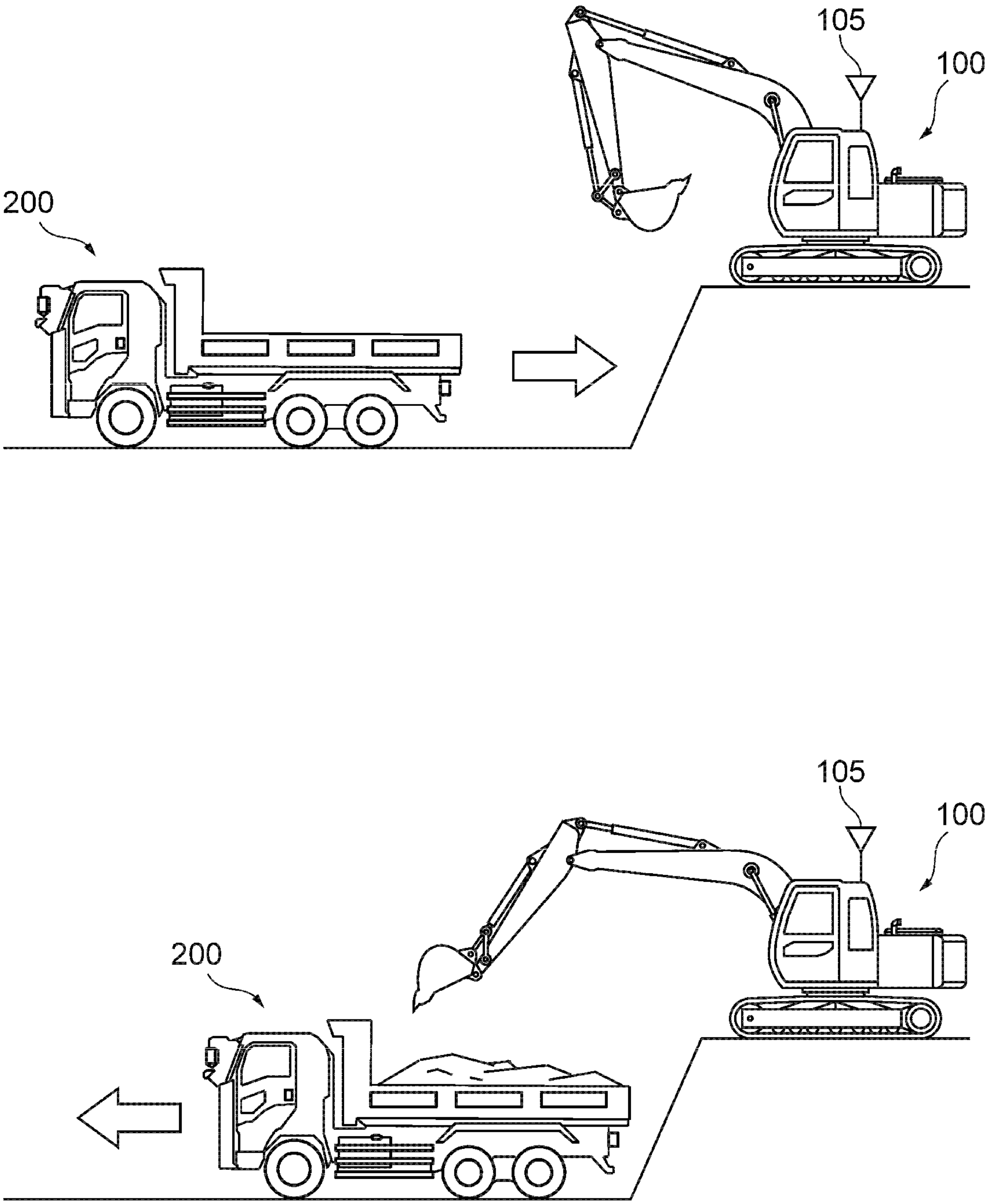
FIG. 12 shows the coordinated work of the excavating machine and the hauling machine shown in FIG. 11.

FIG. 11 shows the work site of the excavating machine 100 that is an unmanned work machine and the hauling machine 200 that is a manned work machine, and the remote control room 400. FIG. 12 shows the coordinated work of the excavating machine 100 and the hauling machine 200 shown in FIG. 11.

As shown in FIG. 11, the excavating machine 100 works in coordination with the hauling machine 200, as in Embodiment 1. As in Embodiment 1, the excavating machine 100 stops above the dig face 300 and excavates the soil and others from the dig face 300, and loads the hauling machine 200 stopping at the bottom of the dig face 300 with the soil and other excavated materials. As in Embodiment 1, the hauling machine 200 executes the work of hauling excavated materials loaded by the loading work of the excavating machine 100.

The remote control room 400 is placed at a location away from the work site. The remote control room 400 includes an antenna 401 that communicates with the excavating machine

100, which is an unmanned work machine, and a remote control terminal 402 that remotely controls the excavating machine 100 according to the input operation of a remote operator. The remote control terminal 402 receives various types of information transmitted from the communication device 105 of the excavating machine 100 via the antenna 401, and outputs the information to the display, speaker and others of the remote control terminal 402 to notify the remote operator. The remote control terminal 402 transmits the input information entered into the remote control terminal 402 by the input operation of the remote operator to the communication device 105 of the excavating machine 100 via the antenna 401.

The upper part of FIG. 12 shows how the hauling machine 200 moves toward a predetermined position, which is a stop position of the hauling machine 200, which can be loaded with the excavated materials through the loading work by the excavating machine 100. The lower part of FIG. 12 shows how the hauling machine 200 leaves out of the predetermined position. As in Embodiment 1, the hauling machine 200 of Embodiment 3 enters and exits from the predetermined position.

Figure 13:
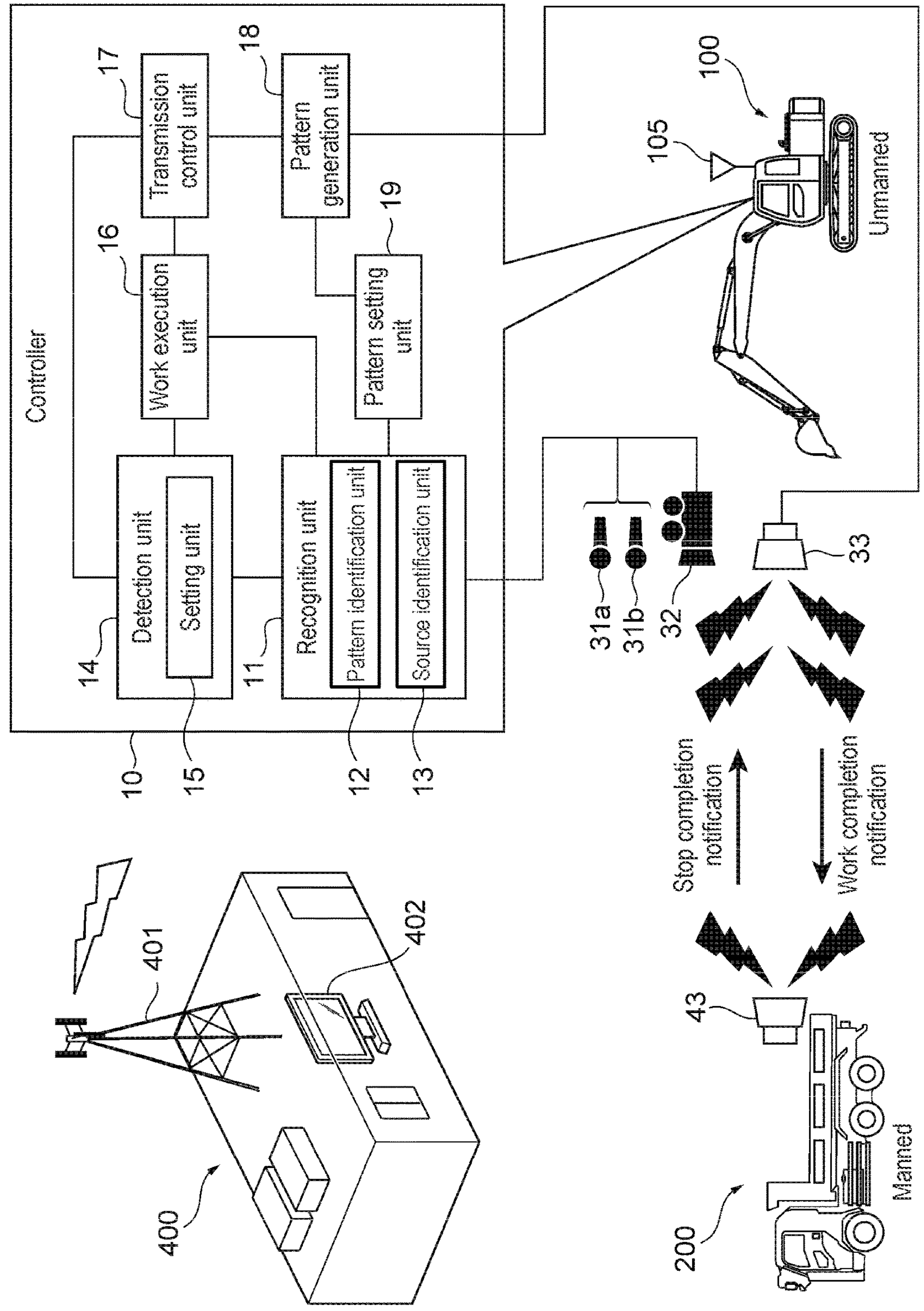
FIG. 13 shows the functional configuration of the excavating machine and the hauling machine shown in FIG. 11.

FIG. 13 shows the functional configuration of the excavating machine 100 and the hauling machine 200 shown in FIG. 11.

As in Embodiment 1, the hauling machine 200 of Embodiment 3 transmits a notification regarding the operating status of the hauling machine 200 or an operating instruction to the excavating machine 100. For example, the notifications transmitted from the hauling machine 200 include a stop completion notification and an emergency stop notification. These stop completion notification and emergency stop notification are similar to the stop completion notification and emergency stop notification of Embodiment 1, respectively. As in Embodiment 1, for the notification, the hauling machine 200 emits warning sound from a horn device 43 preinstalled in the hauling machine 200.

As in Embodiment 1, the excavating machine 100 of Embodiment 3 includes sound collectors 31*a* and 31*b*, an imaging device 32, a horn device 33, and a controller 10. The excavating machine 100 of Embodiment 3 also includes a communication device 105.

As in Embodiment 1, the sound collectors 31*a* and 31*b* constitute a receiver that receives the warning sound indicating the notification transmitted from the hauling machine 200 in response to the operation of the operator aboard the hauling machine 200. The sound collectors 31*a* and 31*b* transmit collected sound signals to the communication device 105. In particular, the sound collectors 31*a*, 31*b* collect the warning sound as the above notification transmitted from the hauling machine 200 and transmit a signal indicating the collected warning sound to the communication device 105. The imaging device 32 transmits a signal of the acquired image to the communication device 105.

As in Embodiment 1, the horn device 33 constitutes a transmitter that transmits a notification regarding the operating status of the excavating machine 100 in the form that the operator aboard the hauling machine 200 can recognize. For example, a work completion notification is a notification regarding the operating status of the excavation machine 100. The work completion notification is similar to the work completion notification in Embodiment 1. As in Embodiment 1, the horn device 33 emits warning sound indicating a notification according to the pattern generated by the controller 10. As in Embodiment 1, the horn device 33 may emit warning sound indicating a notification regarding the operating status of the hauling machine 200.

The communication device 105 transmits a signal of warning sound indicating the notification collected by the sound collectors 31*a* and 31*b* constituting the receiver and an image signal obtained by the imaging device 32 to the remote control terminal 402. For instance, the communication device 105 transmits a signal of warning sound indicating a stop completion notification collected by the sound collectors 31*a* and 31*b* to the remote control terminal 402. In accordance with the warning sound indicating the notification collected by the sound collectors 31*a* and 31*b* constituting the receiver and the image acquired by the imaging device 32, the remote control terminal 402 accepts an input operation from the remote operator. The remote control terminal 402 transmits input information that the remote control terminal 402 receives from the remote operator to the communication device 105. For instance, the remote control terminal 402 transmits input information at the remote control terminal 402 corresponding to a stop completion notification to the communication device 105. The communication device 105 then receives the input information at the remote control terminal 402, which is transmitted from the remote control terminal 402, and transmits it to the controller 10. For instance, the communication device 105 receives input information at the remote control terminal 402 corresponding to a stop completion notification and transmits it to the controller 10.

In accordance with the input information at the remote control terminal 402 received by the communication device 105, the controller 10 controls the operation of the excavating machine 100 that is an unmanned work machine. For instance, the controller 10 controls the operation of the front working device 103 and other devices in accordance with the input information at the remote control terminal 402 corresponding to a stop completion notification, and causes these devices to perform the excavation work and loading work of excavated materials.

As in Embodiment 1, the controller 10 has a recognition unit 11, a detection unit 14, a work execution unit 16, a transmission control unit 17, a pattern generation unit 18, and a pattern setting unit 19.

As in Embodiment 1, the recognition unit 11 recognizes patterns of warning sound collected by the sound collectors 31*a* and 31*b*. As in Embodiment 1, the recognition unit 11 has a pattern identification unit 12 and a source identification unit 13.

As in Embodiment 1, the recognition unit 11 transmits a recognition result to the detection unit 14. The recognition unit 11 transmits the information about the hauling machine 200 that is the source of the warning sound to the communication device 105.

As in Embodiment 1, based on the recognition result of the recognition unit 11, the detection unit 14 detects the details of the notification transmitted from the hauling machine 200 that is a manned work machine. The detection unit 14 transmits the detected details of the notification to the communication device 105. The communication device 105 transmits the detected details of the notification to the remote control terminal 402 and also receives the input information at the remote control terminal 402 that the remote operator entered according to the detected details of the notification. If the input information at the remote control terminal 402 involves work by the work execution unit 16, the communication device 105 transmits the input information to the work execution unit 16. If the input information does not involve work by the work execution unit 16, the communication device 105 transmits the input information to the transmission control unit 17. As in Embodiment 1, the detection unit 14 may be configured to cause the setting unit 15 to change the setting of the correspondence relationship between the warning sound patterns and the details of notifications.

In accordance with the input information at the remote control terminal 402 based on the detection result of the detection unit 14, the work execution unit 16 controls the execution of the work of the excavating machine 100 that is an unmanned work machine. The work execution unit 16 controls the operation of the front working device 103 and other devices according to the input information at the remote control terminal 402 based on the details of the notification detected by the detection unit 14, thus controlling the execution of different types of work of the excavating machine 100. For instance, when the notification detected by the detection unit 14 is the stop completion notification as stated above, and when the input information at the remote control terminal 402 instructs starting of excavating work and loading work of excavated materials, the work execution unit 16 causes to start the excavation work and loading work of the excavated materials. When the notification detected by the detection unit 14 is the emergency stop notification as stated above, and when the input information at the remote control terminal 402 instructs emergency stop of the work, the work execution unit 16 causes to stop the work emergently. When the loading work is completed, the work execution unit 16 transmits a work completion notification indicating the loading work has been completed to the communication device 105. The communication device 105 transmits the work completion notification to the remote control terminal 402 and also receives the input information at the remote control terminal 402 corresponding to the work completion notification and transmits it to the transmission control unit 17.

The transmission control unit 17 controls the transmission of warning sound. In accordance with the input information at the remote control terminal 402 based on the detection result of the detection unit 14 and the progress of the work by the work execution unit 16, the transmission control unit 17 determines the details of notification to be transmitted from the excavating machine 100 and the timing of the transmission. The transmission control unit 17 transmits a control signal instructing the details of notification to be transmitted and the timing of transmission to the pattern generation unit 18. For example, when the communication device 105 transmits the input information at the remote control terminal 402 corresponding to the work completion notification, the transmission control unit 17 transmits a control signal to the pattern generation unit 18 instructing it to immediately transmit the work completion notification as stated above.

As in Embodiment 1, the pattern generation unit 18 generates a warning sound pattern to be transmitted from the horn device 33 in accordance with the control signal transmitted from the transmission control unit 17. As in Embodiment 1, the pattern generation unit 18 transmits a drive signal for the horn device 33 according to the generated warning sound pattern to the horn device 33.

As in Embodiment 1, the pattern setting unit 19 selects patterns of warning sound generated by the pattern generation unit 18 and patterns of warning sound recognized by the recognition unit 11 from a plurality of predetermined patterns of warning sound, and sets the selected patterns in the pattern generation unit 18 and the recognition unit 11. As in Embodiment 1, the pattern setting unit 19 is able to freely set and change the types and number of warning sound patterns generated by the pattern generation unit 18 and the types and number of warning sound patterns recognized by the recognition unit 11 within a predetermined range.

In the coordinated work of the excavating machine 100 and the hauling machine 200 shown in FIG. 13, the flow of processing performed by the excavating machine 100 is basically the same as in the flowchart shown in FIG. 5 of Embodiment 1. However, some processing is different as shown below.

As in Embodiment 1, in step S1, the excavating machine 100 prepares for excavating work and loading work and stands by in an operable state.

As in Embodiment 1, in step S2, the excavating machine 100 determines whether or not it has received a stop completion notification transmitted from the hauling machine 200. As in Embodiment 1, if the excavating machine 100 has not received a stop completion notification, the excavating machine 100 shifts to step S1. If the excavating machine 100 has received a stop completion notification, the excavating machine 100 transmits the notification to the remote control terminal 402. When receiving input information at the remote control terminal 402 based on the notification, the excavating machine 100 shifts to step S3.

In step S3, the excavating machine 100 starts excavating work and loading work of the excavated materials, in accordance with the input information at the remote control terminal 402 based on the stop completion notification. Note that the excavating machine 100 may start at least the loading work in accordance with the input information at the remote control terminal 402 based on the stop completion notification. Note that the excavating machine 100 may start the loading work in accordance with input information at the remote control terminal 402 that has been received prior to the input information at the remote control terminal 402 based on the stop completion notification.

As in Embodiment 1, in step S4, the excavating machine 100 determines whether or not it has received an emergency stop notification. As in Embodiment 1, if the excavating machine 100 has not received an emergency stop notification, the excavating machine 100 shifts to step S6. If the excavating machine 100 has received an emergency stop notification, the excavating machine 100 transmits the notification to the remote control terminal 402. When receiving input information at the remote control terminal 402 based on the notification, the excavating machine 100 shifts to step S5.

In step S5, the excavating machine 100 stops the work of the excavating machine 100 emergently in accordance with the input information at the remote control terminal 402 based on the received emergency stop notification. The emergency stop notification may have been transmitted due to an error by an operator aboard the hauling machine 200. To address this possibility, if the warning sound is not emitted from the hauling machine 200 within a predetermined time elapsed after step S4, the excavating machine 100 may shift to step S6.

As in Embodiment 1, in step S6, the excavating machine 100 determines whether or not the loading work has been completed. As in Embodiment 1, the excavating machine 100 determines whether or not the loading work has been completed by performing image recognition of the image of the loaded amount on the hauling machine 200 acquired by the imaging device 32. As in Embodiment 1, if the loading work has not been completed, the excavating machine 100 shifts to step S3. If the loading work is completed, the excavating machine 100 transmits a work completion notification to the remote control terminal 402, and when receiving the input information at the remote control terminal 402 based on the notification, the excavating machine 100 shifts to step S7.

The determination of whether the loading work is complete may be made by the remote operator, instead of the excavating machine 100 that makes the determination based on the image of the amount of loading in the hauling machine 200 acquired by the imaging device 32. In this case, the excavating machine 100 transmits the image of the amount of loading in the hauling machine 200 acquired by the imaging device 32 to the remote control terminal 402 in real time. The remote operator checks the progress of the loading work from the image on the display of the remote control terminal 402, and when the loading work has been completed, they input a work completion notification with the remote control terminal 402 to transmit it to the excavating machine 100.

In step S7, the excavating machine 100 transmits a work completion notification, in accordance with the input information at the remote control terminal 402. As in Embodiment 1, after that, the excavating machine 100 shifts to step S1.

The time chart for the coordinated work of the excavating machine 100 and the hauling machine 200 shown in FIG. 13 is the same as the time chart shown in FIG. 6 of Embodiment 1.

As described above, the excavating machine 100 of Embodiment 3 operates by remote control, and is an unmanned work machine that works in coordination with the hauling machine 200 that is a manned work machine. The excavating machine 100 of Embodiment 3 includes a receiver that receives a notification regarding the operating status of the hauling machine 200 or an operating instruction to the excavating machine 100, which are transmitted from the hauling machine 200 in response to the operation by an operator aboard the hauling machine 200. The excavating machine 100 of Embodiment 3 includes the communication device 105 that transmits the above notification received by the receiver to the remote control terminal 402 for remote operation and also receives the input information at the remote control terminal 402 that the remote operator entered in response to the notification. The excavating machine 100 of Embodiment 3 includes the controller 10 that controls the operation of the excavating machine 100, in accordance with the input information at the remote control terminal 402 received by the communication device 105.

This allows the excavating machine 100 of Embodiment 3 and the remote operator to share the operating status of the hauling machine 200 and an operating instruction to the excavating machine 100, which are understood by the operator aboard the hauling machine 200, and execute appropriate operations corresponding to the operating status and operating instruction. Therefore, the excavating machine 100 of Embodiment 3, which is an unmanned work machine, reliably coordinates with the hauling machine 200 that is a manned work machine, and smoothly executes work.

The excavating machine 100 of Embodiment 3 includes a transmitter that transmits a notification regarding the operating status of the excavating machine 100 in a form that the operator aboard the hauling machine 200 can recognize.

This allows the excavating machine 100 of Embodiment 3 to share the operating status of the excavating machine 100, which is understood by the excavating machine 100, with the hauling machine 200, and prompt the operator aboard the hauling machine 200 to perform an appropriate action corresponding to the operating status. The excavating machine 100 of Embodiment 3 therefore reliably coordinates with the hauling machine 200 that is a manned work machine, and thus executes the work smoothly.

Furthermore, the excavating machine 100 of Embodiment 3 receives a stop completion notification indicating the completion of the stop of the hauling machine 200 at the predetermined position, transmits the received stop completion notification to the remote control terminal 402, and receives the input information at the remote operation terminal 402 in response to the stop completion notification. The excavating machine 100 of Embodiment 3 starts the loading work in accordance with the received input information at the remote control terminal 402.

This allows the excavating machine 100 of Embodiment 3 to prevent the loading work from being executed before the stopping of the hauling machine 200 has been completed at the predetermined position. The excavating machine 100 of Embodiment 3 therefore reliably coordinates with the hauling machine 200 that is a manned work machine, and thus executes the work smoothly.

Furthermore, the excavating machine 100 of Embodiment 3 transmits a work completion notification indicating that the loading work has been completed.

This allows the excavating machine 100 of Embodiment 3 to prevent the hauling machine 200 from executing the exit operation before the loading work by the excavating machine 100 has been completed. The excavating machine 100 of Embodiment 3 therefore reliably coordinates with the hauling machine 200 that is a manned work machine, and thus executes the work smoothly.

Furthermore, the hauling machine 200 of Embodiment 3 emits warning sound as a notification from the hauling machine 200. In the excavating machine 100 of Embodiment 3, the receiver includes the sound collectors 31*a* and 31*b* that collect the warning sound. In the excavating machine 100 of Embodiment 3, the controller 10 includes the recognition unit 11 that recognizes a pattern of the warning sound collected by the sound collectors 31*a* and 31*b*, and the detection unit 14 that detects the details of the notification transmitted from the hauling machine 200 based on the recognition result of the recognition unit 11. In the excavating machine 100 of Embodiment 3, the controller 10 also has the work execution unit 16 that controls the execution of the work of the excavating machine 100 in accordance with the input information at the remote control terminal 402 based on the detection result of the detection unit 14.

This allows the excavating machine 100 of Embodiment 3 to exchange information with the hauling machine 200 using the warning sound of the horn device 43 that the hauling machine 200 typically includes. The excavating machine 100 of Embodiment 3 exchanges information with the hauling machine 200 without the need of any additional special device to the hauling machine 200 that is a manned work machine. The excavating machine 100 of Embodiment 3 therefore reliably and easily coordinates with the hauling machine 200 that is a manned work machine, and thus executes the work smoothly.

The excavating machine 100 of Embodiment 3 also includes the imaging device 32 that acquires an image of the surroundings. In the excavating machine 100 of Embodiment 3, the recognition unit 11 identifies the hauling machine 200, which is the source of the warning sound, based on the warning sound collected by the sound collectors 31*a* and 31*b* and the image acquired by the imaging device 32.

This allows the excavating machine 100 of Embodiment 3 to easily identify the hauling machine 200 as the source of the warning sound, even if there are many hauling machines 200 in the vicinity of the excavating machine 100. The excavating machine 100 of Embodiment 3 therefore works in coordination with the target hauling machine 200 more reliably even in a work site where there are many hauling machines 200, and thus executes the work smoothly.

In the excavating machine 100 of Embodiment 3, the transmitter includes the horn device 33 that emits warning sound as a notification from the excavating machine 100. In the excavating machine 100 of Embodiment 3, the controller 10 includes the pattern setting unit 19 that selects patterns of warning sound generated by the horn device 33 and patterns of warning sound recognized by the recognition unit 11 from a plurality of predetermined patterns of warning sound, and sets the selected patterns.

This allows the excavating machine 100 of Embodiment 3 to exchange various notifications with the hauling machine 200 about the details on their respective operating statuses using multiple patterns of warning sound correctly. The excavating machine 100 of Embodiment 3 therefore reliably and firmly coordinates with the hauling machine 200 at different work sites, and thus executes the work smoothly.

In the excavating machine 100 of Embodiment 3, the receiver receives an emergency stop notification instructing the excavating machine 100 to stop its work emergently. In the excavating machine 100 of Embodiment 3, the communication device 105 transmits the emergency stop notification received by the receiver to the remote control terminal 402, and also receives the input information at the remote control terminal 402 in response to the emergency stop notification. In the controller 100 of Embodiment 3, the controller 10 controls to stop the work of the excavating machine 100 emergently, in accordance with the input information at the remote control terminal 402 received by the communication device 105.

This allows the excavating machine 100 of Embodiment 3 to emergently stop the work of the excavating machine 100 if the operator aboard the hauling machine 200 finds an abnormality of the excavating machine 100. The excavating machine 100 of Embodiment 3 gives a sense of security to the operator aboard the hauling machine 200, and prompts the operator to coordinate the excavating machine 100 with the hauling machine 200. The excavating machine 100 of Embodiment 3 therefore reliably and smoothly coordinates with the hauling machine 200 that is a manned work machine, and thus executes the work smoothly.

The excavating machine 100 and the hauling machine 200 of Embodiment 3 implement their coordination using warning sound. As in Embodiment 1, the excavating machine 100 and the hauling machine 200 may implement their coordination using the light of warning and illumination lights that these machines typically have.

That is, as in Embodiment 1, the transmitter of the hauling machine 200 may include not only the horn device 43 but also a lamp such as the illumination light or warning light that the hauling machine 200 typically has. As in Embodiment 1, the transmitter of the excavating machine 100 may include not only the horn device 33 but also a lamp such as the illumination light or warning light that the excavating machine 100 typically has. As in Embodiment 1, the receiver of the excavating machine 100 may include not only the sound collectors 31*a*, 31*b* but also the imaging device 32. As in Embodiment 1, in the controller 10 of the excavating machine 100, the recognition unit 11 may recognize a blinking pattern of the lamp light from the hauling machine 200, and the detection unit 14 may detect the details of the notification based on the recognition result of the blinking pattern of the lamp light. As in Embodiment 1, the pattern generation unit 18 and the pattern setting unit 19 also may be implemented by replacing the warning sound patterns with the lamp light blinking patterns.

Embodiment 4

Figure 14:
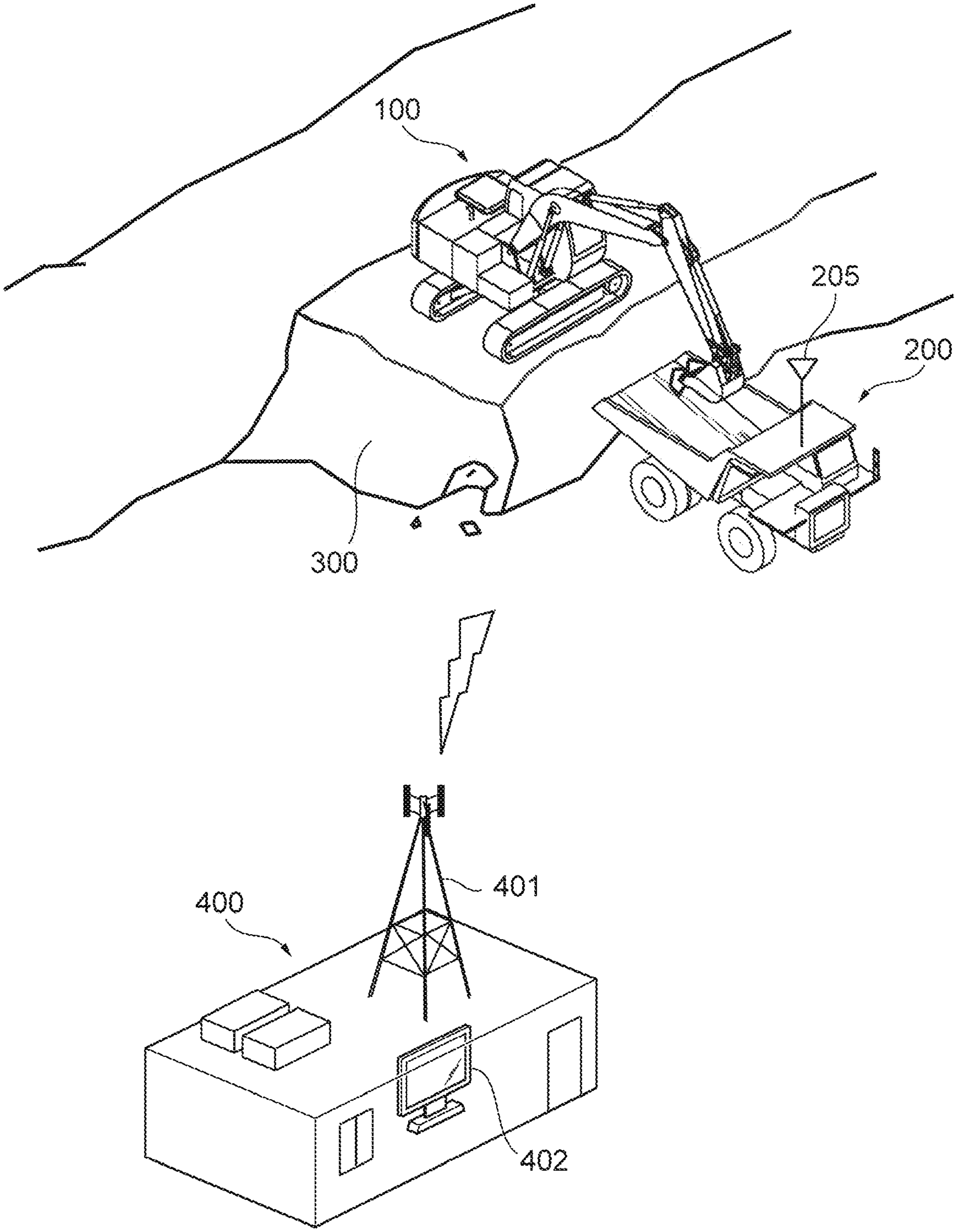
FIG. 14 shows the work site of the excavating machine that is a manned work machine and the hauling machine that is an unmanned work machine, and the remote control room according to Embodiment 4.
Figure 15:
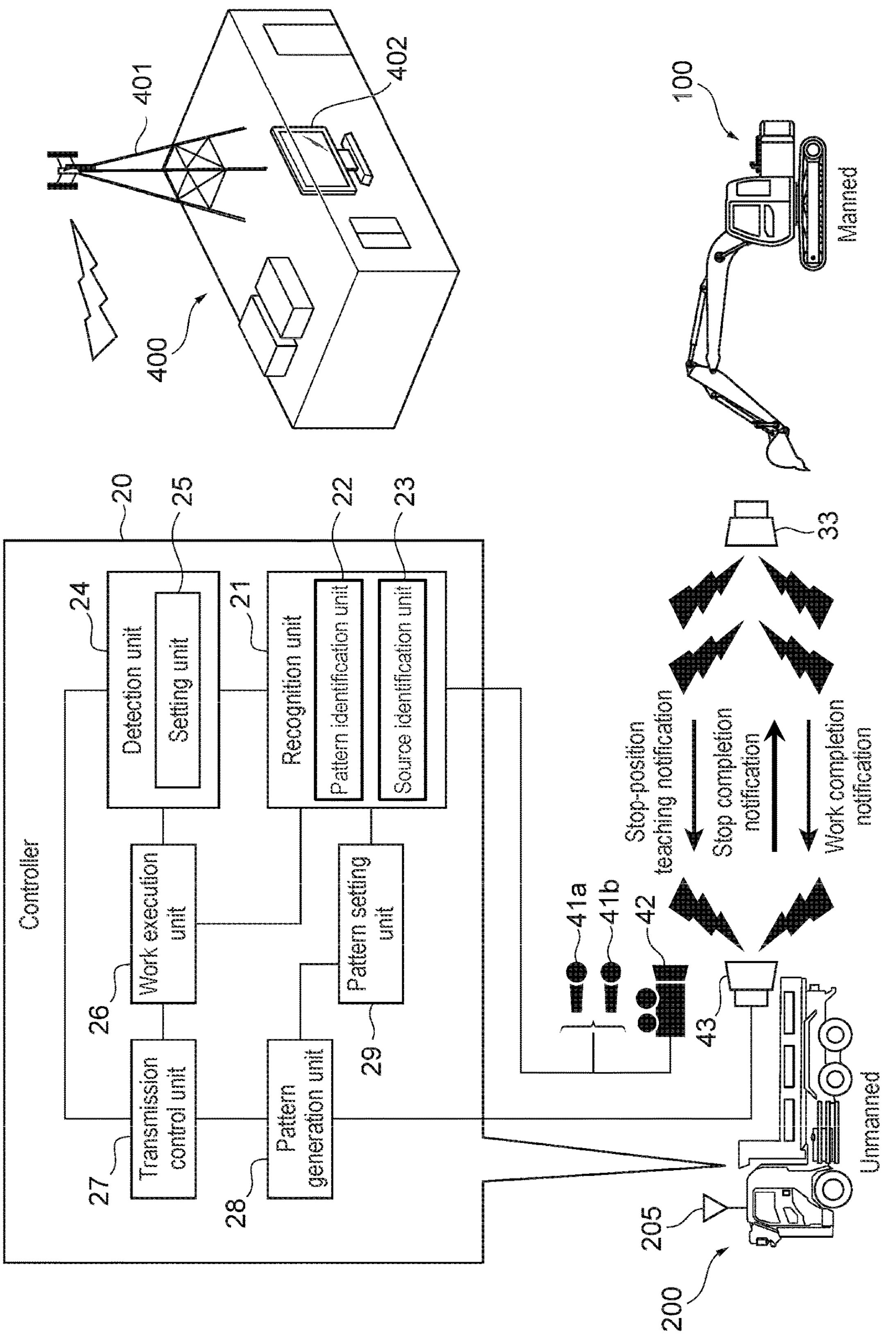
FIG. 15 shows the functional configuration of the excavating machine and the hauling machine shown in FIG. 14.

Referring to FIGS. 14 to 15, the following describes an unmanned work machine according to Embodiment 4. The following descriptions on Embodiment 4 omit the descriptions on similar configurations and operations to Embodiments 1 to 3.

FIG. 14 shows the work site of the excavating machine 100 that is a manned work machine and the hauling machine 200 that is an unmanned work machine, and the remote control room 400 according to Embodiment 4. FIG. 15 shows the functional configuration of the excavating machine 100 and the hauling machine 200 shown in FIG. 14.

In Embodiment 3, the excavating machine 100 is an unmanned work machine and the hauling machine 200 is a manned work machine. In Embodiment 4, the hauling machine 200 is an unmanned work machine and the excavating machine 100 is a manned work machine.

As in Embodiment 2, the excavating machine 100 of Embodiment 4 transmits a notification regarding the operating status of the excavating machine 100 or an operating instruction to the hauling machine 200. For example, the notifications transmitted from the excavating machine 100 of Embodiment 4 include a work completion notification and a stop-position teaching notification. These work completion notification and stop-position teaching notification are similar to the work completion notification and stop-position teaching notification of Embodiment 2, respectively. As in Embodiment 2, for the notification, the excavating machine 100 emits warning sound from the horn device 33 preinstalled in the excavating machine 100.

As in Embodiment 2, the hauling machine 200 of Embodiment 4 transmits a notification regarding the operating status of the hauling machine 200. For instance, the notifications transmitted from the hauling machine 200 of Embodiment 4 include a stop completion notification similar to Embodiment 2. As in Embodiment 2, for the notification, the hauling machine 200 emits warning sound from the horn device 43.

As in Embodiment 2, the hauling machine 200 of Embodiment 4 includes sound collectors 41*a* and 41*b*, an imaging device 42, a horn device 43, and a controller 20. The hauling machine 200 of Embodiment 4 also includes a communication device 205 that communicates with a remote control room 400.

As in Embodiment 2, the sound collectors 41*a* and 41*b* constitute a receiver that receives the warning sound indicating the notification transmitted from the excavating machine 100 in response to the operation of the operator aboard the excavating machine 100. The sound collectors 41*a* and 41*b* transmit collected sound signals to the communication device 205. Other configurations of the sound collectors 41*a* and 41*b* are similar to the sound collectors 31*a* and 31*b* of Embodiment 3.

As in Embodiment 2, the horn device 43 constitutes a transmitter that transmits a notification regarding the operating status of the hauling machine 200 in the sound form that the operator aboard the excavating machine 100 can recognize. The horn device 43 emits warning sound indicating the notification according to the pattern generated by the controller 20. Other configurations of the horn device 43 are similar to the horn device 33 of Embodiment 3.

The communication device 205 transmits a signal of warning sound indicating the notification collected by the sound collectors 41*a* and 41*b* constituting the receiver and an image signal obtained by the imaging device 42 to the remote control terminal 402. The communication device 205 then receives the input information at the remote control terminal 402, which is input by the remote operator, and transmits it to the controller 20. For instance, the communication device 205 transmits a work completion notification received by the receiver to the remote control terminal 402 and also receives the input information at the remote control terminal 402 corresponding to the work completion notification and transmits it to the controller 20. Other configurations of the communication device 205 are similar to the communication device 105 of Embodiment 3.

In accordance with the input information at the remote control terminal 402 received by the communication device 205, the controller 20 controls the operation of the hauling machine 200 that is an unmanned work machine. For example, in accordance with the input information at the remote control terminal 402 based on a stop-position teaching notification, the controller 20 controls the operations of the accelerator device, the braking device, the steering device, and other devices of the hauling machine 200 to execute the entering and stopping operation at the predetermined position. When stopping of the hauling machine 200 at the predetermined position has been completed, the controller 20 notifies the communication device 205 accordingly. The communication device 205 transmits a stop completion notification to the remote control terminal 402 and also receives the input information at the remote control terminal 402 corresponding to the stop completion notification and transmits it to the controller 20. In accordance with the input information at the remote control terminal 402 received by the communication device 205, the controller 20 drives the horn device 43 to emit a stop completion notification. For example, in accordance with the input information at the remote control terminal 402 based on a work completion notification, the controller 20 controls the operations of the accelerator device, the braking device, the steering device, and other devices of the hauling machine 200 to execute the exit operation (hauling work) from the predetermined position.

The controller 20 has a recognition unit 21, a detection unit 24, a work execution unit 26, a transmission control unit 27, a pattern generation unit 28, and a pattern setting unit 29. These recognition unit 21, detection unit 24, work execution unit 26, transmission control unit 27, pattern generation unit 28, and pattern setting unit 29 are similar to the recognition unit 11, detection unit 14, work execution unit 16, transmission control unit 17, pattern generation unit 18, and pattern setting unit 19 of Embodiment 3, respectively.

In the coordinated work of the excavating machine 100 and the hauling machine 200 shown in FIG. 15, the flow of processing performed by the hauling machine 200 is basically the same as in the flowchart shown in FIG. 8 of Embodiment 2. However, some processing is different as shown below.

In step S11, as in Embodiment 2, the hauling machine 200 moves toward the predetermined position, which is the stopping position of the hauling machine 200 that can be loaded with excavated materials.

In step S12, as in Embodiment 2, the hauling machine 200 determines whether or not it has received a stop-position teaching notification transmitted from the excavating machine 100. As in Embodiment 2, if the hauling machine 200 has not received a stop-position teaching notification, the hauling machine 200 shifts to step S11. If the hauling machine 200 has received a stop-position teaching notification, the hauling machine 200 transmits the notification to the remote control terminal 402. When receiving input information at the remote control terminal 402 based on the notification, the hauling machine 200 shifts to step S13.

In step S13, the hauling machine 200 stops at the predetermined position in accordance with the input information at the remote control terminal 402 based on the stop-position teaching notification. Then the hauling machine 200 transmits a stop completion notification to the remote control terminal 402. When receiving the input information at the remote control terminal 402 based on the stop completion notification, the hauling machine 200 transmits the stop completion notification in accordance with the input information.

In step S14, as in Embodiment 2, the hauling machine 200 prepares to exit from the predetermined position and waits until the loading work with excavated materials has been completed.

In step S15, as in Embodiment 2, the hauling machine 200 determines whether or not it has received a work completion notification transmitted from the excavating machine 100. As in Embodiment 2, if the hauling machine 200 has not received a work completion notification, the hauling machine 200 shifts to step S13. If the hauling machine 200 has received a stop completion notification, the hauling machine 200 transmits the notification to the remote control terminal 402. When receiving input information at the remote control terminal 402 based on the notification, the hauling machine 200 shifts to step S16.

In step S16, the hauling machine 200 exits from the predetermined position in accordance with the input information at the remote control terminal 402 based on the work completion notification. That is, the hauling machine 200 starts the hauling work. As in Embodiment 2, after that, the hauling machine 200 shifts to step S11.

The time chart for the coordinated work of the excavating machine 100 and the hauling machine 200 shown in FIG. 15 is the same as the time chart shown in FIG. 9 of Embodiment 2.

As described above, the hauling machine 200 of Embodiment 4 operates by remote control, and is an unmanned work machine that works in coordination with the excavating machine 100 that is a manned work machine. The hauling machine 200 of Embodiment 4 includes a receiver that receives a notification regarding the operating status of the excavating machine 100 or an operating instruction to the hauling machine 200, which are transmitted from the excavating machine 100 in response to the operation by an operator aboard the excavating machine 100. The hauling machine 200 of Embodiment 4 includes the communication device 205 that transmits the above notification received by the receiver to the remote control terminal 402 for remote operation and also receives the input information at the remote control terminal 402 that the remote operator entered in response to the notification. The hauling machine 200 of Embodiment 4 includes the controller 20 that controls the operation of the hauling machine 200 in accordance with the input information at the remote control terminal 402 received by the communication device 205.

This allows the hauling machine 200 of Embodiment 4 and the remote operator to share the operating status of the excavating machine 100 and an operating instruction to the hauling machine 200, which are understood by the operator aboard the excavating machine 100, and execute appropriate operations corresponding to the operating status and operating instruction. Therefore, the hauling machine 200 of Embodiment 4, which is an unmanned work machine, reliably coordinates with the excavating machine 100 that is a manned work machine, and smoothly executes work.

Furthermore, in the hauling machine 200 of Embodiment 4, the receiver receives a work completion notification indicating that the loading work by the excavating machine 100 has been completed. In the hauling machine 200 of Embodiment 4, the communication device 205 transmits the work completion notification received by the receiver to the remote control terminal 402 and also receives the input information at the remote control terminal 402 corresponding to the work completion notification. In the hauling machine 200 of Embodiment 4, the controller 20 controls to start the hauling work in accordance with the input information at the remote control terminal 402 received by the communication device 205.

This allows the hauling machine 200 of Embodiment 4 to prevent the hauling work from being executed before the loading work of the excavating machine 100 has been completed. The hauling machine 200 of Embodiment 4 therefore reliably coordinates with the excavating machine 100 that is a manned work machine, and thus executes the work smoothly.

Furthermore, in the hauling machine 200 of Embodiment 4, the receiver receives a stop-position teaching notification teaching the hauling machine 200 stopping at the predetermined position, and the communication device 205 transmits the stop-position teaching notification received by the receiver to the remote control terminal 402 and also receives the input information at the remote control terminal 402 corresponding to the stop-position teaching notification. In the hauling machine 200 of Embodiment 4, the controller 20 controls to stop the hauling machine 200 at the predetermined position in accordance with the input information at the remote control terminal 402 received by the communication device 205. In the hauling machine 200 of Embodiment 4, the communication device 205 transmits a stop completion notification indicating the completion of the stop of the hauling machine 200 at the predetermined position to the remote control terminal 402, and receives the input information at the remote operation terminal 402 based on the stop completion notification. In the hauling machine 200 of Embodiment 4, the transmitter transmits a stop completion notification indicating that the stopping of the hauling machine 200 at the predetermined position has been completed in accordance with the input information at the remote control terminal 402 received by the communication device 205.

This allows the hauling machine 200 of Embodiment 4 to stop at the predetermined position reliably, and also prevents the excavating machine 100 from executing the loading work before the stopping of the hauling machine 200 has been completed at the predetermined position. The hauling machine 200 of Embodiment 4 therefore reliably coordinates with the excavating machine 100 that is a manned work machine, and thus executes the work smoothly.

The above embodiments describe the case where one of the manned work machine and the unmanned work machine is the excavating machine 100, and the other is the hauling machine 200. In the present invention, both of the manned work machine and the unmanned work machine may be the excavating machines 100, and both may be the hauling machines 200. In the present invention, the manned work machine and the unmanned work machine may be work machines other than the excavating machine 100 or the hauling machine 200, which may be a crane, for example.

Others

The present invention is not limited to the above embodiments, and may include various modifications. For instance, the entire detailed configuration of the embodiments described above for explanatory convenience is not always necessary for the present invention. A part of one embodiment may be replaced with the configuration of another embodiment, or the configuration of one embodiment may be added to the configuration of another embodiment. A part of the configuration of each embodiment may include another configuration that is added, or may be deleted or replaced with another configuration.

A part or all of the configurations, functions, processing units, processing means and others as described above may be designed in the form of an integrated circuit to be implemented as hardware. The processor may interpret and execute a program that implements each configuration or function as described above, thereby implementing them as software. Programs for implementing these functions, and information such as tapes and files can be stored in a storage device such as a memory, a hard disk, or solid state drive (SSD) or a recording medium such as an IC card, SD card, or DVD.

Control lines and information lines shown are those required for description, and all of the control line and information lines of a product are not always illustrated. It may be considered that in an actual product, almost all configurations are mutually connected.

REFERENCE SIGNS LIST

10, 20 Controller
11, 21 Recognition unit
14, 24 Detection unit
16, 26 Work execution unit
19, 29 Pattern setting unit
31*a*, 31*b*, 41*a*, 41*b* Sound collector (receiver)
32, 42 Imaging device
33, 43 Horn device (transmitter)
100 Excavating machine (unmanned work machine, manned work machine)
105, 205 Communication device
200 Hauling machine (unmanned work machine, manned work machine)
402 Remote control terminal

The invention claimed is:

1. An unmanned hydraulic excavator capable of working in coordination with a manned dump truck, comprising:
- a sound collector that collects warning sound;
- a horn device that emits warning sound; and
- a controller configured to control an operation of the unmanned hydraulic excavator based on warning sound collected by the sound collector and to cause the horn device to emit warning sound as a notification indicating that the operation of the unmanned hydraulic excavator has been completed, wherein the controller is configured to:
- recognize a pattern of warning sound emitted from the manned dump truck by an operation of an operator aboard the manned dump truck and collected by the sound collector;
- detect a notification indicating that stopping of the manned dump truck at a predetermined position has been completed based on a recognition result of the pattern;

instruct the unmanned hydraulic excavator to start loading work of excavated materials to the manned dump truck based on the detected notification indicating that the stopping of the manned dump truck at the predetermined position has been completed; and when the loading work of the excavated materials to the manned dump truck by the unmanned hydraulic excavator is completed, generate a pattern of warning sound as a notification indicating that the loading work has been completed, and cause the horn device to emit warning sound according to the generated pattern to the manned dump truck.

2. The unmanned work machine according to claim 1, further comprising an imaging device that acquires an image of surroundings, wherein the controller is configured to identify the manned dump truck, which is a source of the warning sound, based on the warning sound collected by the sound collector and the image acquired by the imaging device.

3. The unmanned work machine according to claim 1, wherein the transmitter includes a horn device that emits warning sound that is the notification from the unmanned work machine, and wherein the controller is configured to select a pattern of the warning sound emitted by the horn device and a pattern of the recognized warning sound from a plurality of predetermined patterns, and to set the selected patterns.

4. An unmanned dump truck capable of working in coordination with a manned hydraulic excavator, comprising:

a sound collector that collects warning sound;

a horn device that emits warning sound; and a controller configured to control an operation of the unmanned dump truck based on warning sound collected by the sound collector and to cause the horn device to emit warning sound as a notification indicating that the operation of the unmanned dump truck has been completed, wherein the controller is configured to:

recognize a pattern of warning sound emitted from the manned hydraulic excavator by an operation of an operator aboard the manned hydraulic excavator and collected by the sound collector as a notification teaching stopping at a predetermined position;

detect a notification teaching the stopping at the predetermined position based on a recognition result of the pattern;

generate a pattern of warning sound as a notification indicating that stopping of the unmanned dump truck at the predetermined position has been completed based on the detected notification teaching the stopping at the predetermined position, and cause the horn device to emit warning sound according to the generated pattern to the manned hydraulic excavator;

recognize a pattern of warning sound emitted from the manned hydraulic excavator by an operation of the operator aboard the manned hydraulic excavator and collected by the sound collector as a notification indicating that loading work of excavated materials to the unmanned dump truck by the manned hydraulic excavator has been completed;

detect a notification indicating that the loading work of the excavated materials to the unmanned dump truck by the manned hydraulic excavator has been completed based on a recognition result of the pattern; and start hauling work of the unmanned dump truck based on the detected notification indicating that the loading work of the excavated materials to the unmanned dump truck by the manned hydraulic excavator has been completed.

* * * * *